(12) United States Patent
Katagiri et al.

(10) Patent No.: US 7,761,006 B2
(45) Date of Patent: Jul. 20, 2010

(54) METHOD FOR DESIGNING OPTICAL NETWORK, AND COMPUTER READABLE MEDIUM

(75) Inventors: Toru Katagiri, Kawasaki (JP);
Kazuyuki Tajima, Kawasaki (JP);
Tomohiro Hashiguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 388 days.

(21) Appl. No.: 11/808,911

(22) Filed: Jun. 13, 2007

(65) Prior Publication Data

US 2007/0253712 A1    Nov. 1, 2007

Related U.S. Application Data

(63) Continuation-in-part of application No. 11/705,582, filed on Feb. 13, 2007, now abandoned.

(30) Foreign Application Priority Data

Apr. 27, 2006  (JP) ............................. 2006-123908
Jun. 14, 2006  (JP) ............................. 2006-165008
Feb. 15, 2007  (JP) ............................. 2007-035463

(51) Int. Cl.
*H04B 10/20* (2006.01)
*H04L 12/28* (2006.01)

(52) U.S. Cl. .................. 398/59; 398/4; 398/9; 370/258

(58) Field of Classification Search .................. 398/3, 398/4, 9, 59; 370/258; 709/251
See application file for complete search history.

(56) References Cited

U.S. PATENT DOCUMENTS 6,819,662 B1 * 11/2004 Grover et al. ............... 370/351
2002/0036988 A1 * 3/2002 Cardwell et al. ............ 370/238
2004/0073638 A1 * 4/2004 Jenkins ....................... 709/223

FOREIGN PATENT DOCUMENTS

JP    2000-232472    8/2000

OTHER PUBLICATIONS

Ramesh Bhandari, "Optimal Physical Diversity Algorithms and Survivable Networks" Jul. 1-3, 1997, IEEE, Session 20, Alexandria, Egypt, pp. 433-441.

* cited by examiner

*Primary Examiner*—Nathan M Curs
(74) *Attorney, Agent, or Firm*—Staas & Halsey LLP

(57) ABSTRACT

An appropriate ring topology is selected by searching network topology information on the basis of given information about client signal paths on a predetermined condition, and a wavelength ring accommodating the client signal paths and having an optimal transmission characteristic is designed on the basis of the selected ring topology. Accordingly, accommodation of client signal paths in an optical network is efficiently designed.

17 Claims, 30 Drawing Sheets

FIG. 4

| No | End Node | End Node | Traffic Volume (Bandwidth) x (Number of Paths) | Processed Flag | Non-Accommodatable Flag |
|---|---|---|---|---|---|
| D01 | A | B | OC-48×2 | 0 | 0 |
| D02 | D | E | OC-48×1 | 0 | 0 |
| D03 | B | D | OC-48×1 | 0 | 0 |
| D04 | G | F | OC-48×1 | 0 | 0 |
| D05 | F | H | OC-48×1 | 0 | 0 |
| D06 | C | E | OC-48×1 | 0 | 0 |

FIG. 17

| LINK | COST (distance[km]) |
|---|---|
| L(A,B) | 30 |
| L(B,C) | 30 |
| L(C,D) | 30 |
| L(D,A) | 30 |
| L(C,E) | 30 |
| L(D,E) | 30 |
| L(C,F) | 50 |
| L(E,F) | 90 |
| L(F,G) | 70 |
| L(F,H) | 60 |
| L(B,G) | 80 |
| L(G,H) | 60 |

| No | End Node | End Node | Traffic Volume (Bandwidth) × (Number of Paths) | Processed Flag | Non-Accomodatable Flag |
|---|---|---|---|---|---|
| D01 | A | B | OC-48×2 | 0 | 0 |
| D02 | A | D | OC-48×1 | 0 | 0 |
| D03 | B | H | OC-48×1 | 0 | 0 |
| D04 | B | F | OC-48×1 | 0 | 0 |
| D05 | B | E | OC-48×1 | 0 | 0 |

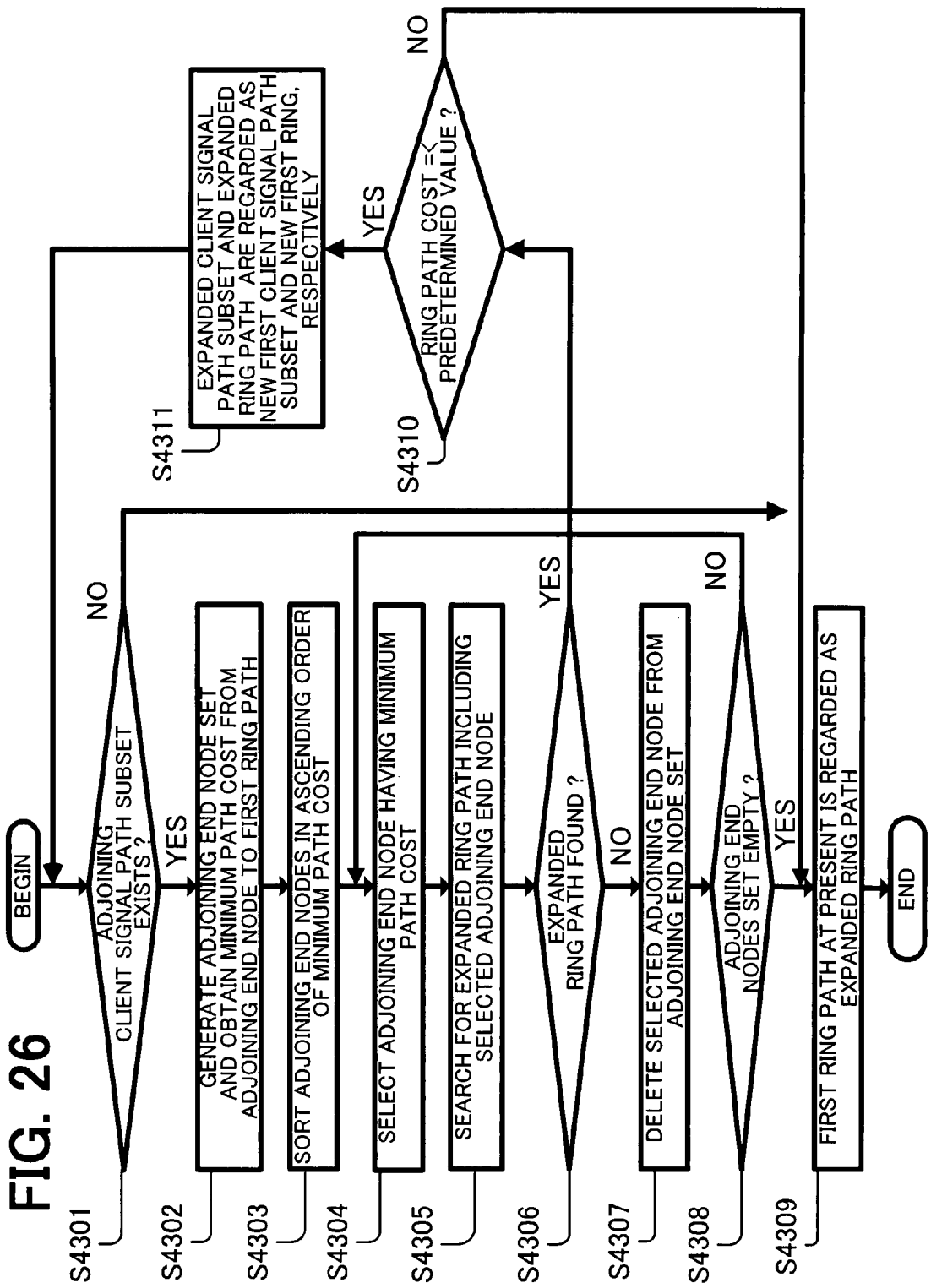

METHOD FOR DESIGNING OPTICAL NETWORK, AND COMPUTER READABLE MEDIUM

CROSS-REFERENCE TO RELATED APPLICATION

This application is a continuation-in-part of a U.S. patent application titled "METHOD FOR DESIGNING OPTICAL NETWORK, OPTICAL NETWORK, AND COMPUTER READABLE MEDIUM", having application Ser. No. 11/705,582, filed on Feb. 13, 2007, now abandoned. This application is also related to Japanese patent application No. 2006-123908 filed Apr. 27, 2006, the entire contents of which are hereby incorporated by reference.

BACKGROUND OF THE INVENTION

1. Field of the Invention

The present invention relates to a technique of designing an optical network and particularly to a method for designing an optical network, an optical network, and a recording medium, adapted to efficiently accommodate paths of various client signals in an optical network of diversified network topology, such as ring, ring interconnection, and mesh.

2. Description of the Related Art

In optical networks represented by a WDM (Wavelength Division Multiplexing) network, paths of various client signals need to be accommodated.

Examples of the client signals include a SONET (ANSI T1.105 recommendation: Synchronous Optical Network Basic Description Including Multiplex Structure, Rates, and Formats) signal; an SDH (ITU-T recommendation G.803: Architecture of Transport Networks Based on The Synchronous Digital Hierarchy) signal; a Gb Ethernet® signal; a 10 Gb Ethernet® signal; and a Fiber Channel signal.

In recent years, an optical transmission/reception card for a WDM transmitting device having both branching/inserting function and transponder function for SONET signals and SDH signals (hereinafter referred to as SONET/SDH signals) has been developed, so that a SONET/SDH network can be established on a WDM network by using only a WDM transmitting device.

Conventionally, a SONET/SDH network has been established on a WDM network by individually preparing a WDM transmitting device for transmitting WDM signals and a SONET/SDH ADM (Add-Drop Multiplexer) device for transmitting SONET/SDH signals and by using the both devices. Furthermore, the networks thereof have been independently designed on respective WDM network and SONET/SDH network layers.

In the following description, the WDM network is used as a representative example of optical networks, and the SONET signal is used as a representative example of client signals. However, other types of optical networks and other types of client signals, such as SDH signals, can also be applied.

When a path of SONET signals is to be accommodated in the WDM network, the path in the WDM network through which the SONET signals pass needs to be in a form of ring topology considering protection against abnormal transmission (e.g., failure in a device, increased loss in lines, or disconnection).

In order to actually accommodate a path of the SONET signals in a ring topology, a wavelength ring of a predetermined band (e.g., a wavelength ring of 10 Gbps), which is a ring path for accommodating a bundle of client signal paths, needs to be assigned in the ring topology.

Then, respective client signal paths are accommodated in the assigned wavelength ring while considering the bandwidths of the respective signals. Thus, a plurality of wavelength rings may be assigned to one ring topology.

When a path of SONET signals is to be accommodated in the WDM network, network topology information is established by inputting information about a connection relationship among nodes in the WDM network to be designed. Then, all ring topologies that can exist on the WDM network are searched for on the basis of the network topology information and are held.

When a wavelength ring is to be assigned on the WDM network, a ring topology that is determined to be optimal by a designer is selected from among the searched and held ring topologies, and then a wavelength ring to accommodate, for example, ring paths of the SONET network is assigned on the selected ring topology. That is, accommodation design is performed on the basis of information about transmitting end nodes and receiving end nodes and signal bandwidths included in information of respective client signal paths so that the number of wavelength rings in the WDM network is the smallest and that the total amount of optical transmission/reception cards mounted on respective nodes required to accommodate the client signal paths is the smallest.

Also, optimization considering a transmission characteristic, e.g., the length of a wavelength ring to accommodate client signal paths is shortened as much as possible, is required. A ring topology satisfying the requirement needs to be selected from among many ring topologies through determination made by a designer.

A technique of automatically designing a network transmission path including ring protection is disclosed in Patent Document 1 (Japanese Unexamined Patent Application Publication No. 2000-232472).

The following problems may arise when paths of client signals such as SONET/SDH signals are to be accommodated in an optical network, such as the WDM network.

(1) It takes a lot of time to search for all ring topologies when the network topology is complicated.

(2) In a large scale of network where the number of all ring topologies is large, there exist a plurality of ring topologies capable of accommodating a SONET/SDH path. In that case, accommodation design needs to be performed by determining an optimal ring topology to accommodate the SONET/SDH path. However, the determination requires a lot of time, which inhibits efficient designing.

In a conventional method for counting all paths that can be obtained from topology information, very long time and enormous storage capacity are required as a network scale becomes larger, which degrades efficiency of designing. For example, in recent years, many fibers have been laid in urban areas in accordance with the demand for networks, and the topology has become very complicated accordingly. This causes enormous time to be required in designing networks.

With the increasing complexity of the topology and the increase in capacity of each ring network, a larger ring path is designed to accommodate more client signal paths. However, if the ring path is too large, signals cannot be transmitted in an optical form between devices, and thus a regenerator needs to be provided therebetween. This results in an increase in the cost accordingly.

SUMMARY OF THE INVENTION

The present invention is directed to providing a method for designing an optical network, an optical network, and a recording medium, for efficiently performing accommodation of client signal paths in an optical network by selecting a ring topology adapted to given client signal paths from a network topology on a predetermined condition and by assigning one or more wavelength rings that optimally accommodate the client signal paths in the selected ring topology.

According to one aspect of the present invention, there is provided a method comprising providing network topology information defining a connection relationship between nodes of the optical network, providing client signal path information for each client signal path, the client signal path information including end node identification information and path bandwidth information, the end node identification information identifying a pair of end nodes comprising a transmitting end node and a receiving end node of the client signal path, the path bandwidth information indicating a bandwidth of the client signal path between the pair of end nodes, a first path subset selecting step of selecting a first path subset of a total path set of client signal paths to be accommodated in the optical network, a first ring selecting step of selecting a first ring topology including end nodes of all client signal paths included in the first path subset, a first path expanding step of expanding the first path subset into a second path subset of the total path set by adding to the first path subset an additional client signal path that is not included in the first path subset and that has at least one node of the first ring topology as an end node thereof, and a first ring expanding step of searching the network topology information for a second ring topology on a predetermined condition, the second ring topology including all nodes of the first ring topology and a pair of end nodes of the additional client signal path.

Accordingly, when a ring topology capable of accommodating a set of client signal paths is given, the set of client signal paths can be expanded. Also, the given ring topology can be corrected so as to accommodate the expanded set of client signal paths and to satisfy a predetermined condition.

The predetermined condition may include, for example, (1) connection links between the respective nodes in the optical network are weighted, and the distance of a ring topology calculated on the basis of the weight is the shortest; (2) the total number of hops in the ring topology is the smallest; and (3) OSNR (Optical Signal-Noise Ratio) of the ring topology is the largest.

According to another aspect of the present invention, there is provided a method further comprising a second path subset selecting step of selecting the second path subset as a first path subset, a second ring selecting step of selecting the second ring topology as a first ring topology, a second path expanding step of expanding the first path subset into a second path subset by performing the first path expanding step on the first path subset selected by the second path subset selecting step, a second ring expanding step of expanding the first ring topology into the second ring topology by performing the first ring expanding step on the first ring topology selected by the second ring selecting step, and a expansion repeating step of repeating the second path subset selecting step, the second ring selecting step, the second path expanding step, and the second ring expanding step, until the first path subset cannot be expanded any more or until the first ring topology cannot be expanded any more.

In this case, the second path subset selecting step can select, as a first path subset, an initial client signal path from the total path set of client signal paths, the second ring selecting step can select, as the first ring topology, a ring topology including a pair of end nodes of the selected client signal path, and the second path subset and the second ring topology obtained by the expansion repeating step are determined to be an expanded path subset and an expanded ring topology of the selected initial client signal path, respectively.

Accordingly, by specifying an initial client signal path in the entire set of client signal paths to be accommodated in the optical network, a largest set of client signal paths (expanded subset of client signal paths) that includes the specified client signal path and that can be accommodated in a ring topology satisfying the predetermined condition; and a ring topology (expanded ring topology) capable of accommodating the expanded subset of client signal paths and satisfying the predetermined condition can be obtained at the same time.

According to still another aspect of the present invention, there is provided a method further comprising assigning to the expanded ring topology one or more wavelength rings each having a predetermined wavelength and bandwidth, accommodating each of one or more client signal paths included in the expanded path subset by one of the one or more wavelength rings, searching the network topology information, on the predetermined condition, for a corrected ring topology corresponding to each of the one or more wavelength rings, the corrected ring topology including end nodes of one or more client signal paths accommodated by each of the one or more wavelength rings, and correcting each of the one or more wavelength rings to a corrected wavelength ring having the corrected ring topology.

Accordingly, a path passed by a wavelength ring accommodating client signal paths can be corrected and optimized by considering a transmission characteristic such as a transmission distance.

By searching for a ring topology which passes the end nodes (transmission and reception nodes) of a client signal path given at search for a ring topology on the optical network, the number of ring topologies to be searched for can be reduced, so that search for a ring topology can be efficiently performed at high speed.

When a wavelength ring for accommodating actual client signal paths is assigned on the basis of the found ring topology, the ring topology passed by the wavelength ring can be corrected and optimized by considering a transmission characteristic such as a transmission distance. Accordingly, accommodation of client signal paths can be efficiently designed at high speed.

Furthermore, according to the present invention, there is provided a method comprising providing network topology information defining a communication link between nodes of the network with a cost assigned to the communication link, providing client signal path information for each client signal path included in a client signal path set of client signal paths to be accommodated in the network, the client signal path information including end node identification information and path bandwidth information, the end node identification information identifying a pair of end nodes comprising a transmitting end node and a receiving end node of the client signal path, the path bandwidth information indicating a bandwidth of the client signal path between the pair of end nodes, a first client signal path subset providing step of providing a first client signal path subset which is a subset of the client signal path set, a first ring path providing step of providing a first ring path which is a ring path including end nodes of all client signal paths included in the first client signal path subset, a adjoining client signal path subset generating step of selecting, from among client signal paths that are included in the client signal path set and that are not included in the first client signal path subset, a client signal path having a first end node included in the first ring path and a second end node not included in the first ring path, so as to generate a adjoining client signal path subset which is a set of the one or more client signal paths selected, an adjoining end node set generating step of selecting the second end node from among end nodes of one or more client signal paths in the adjoining client signal path subset, so as to generate an adjoining end node set which is a set of the one or more second end nodes selected, an cost-optimum adjoining end node selecting step of selecting, from the adjoining end node set, a cost-optimum adjoining end node which is an end node satisfying a predetermined path cost condition, wherein a path cost of a path is calculated as the sum of one or more costs each assigned to the communication link included in the path, a first client signal path subset expanding step of expanding the first client signal path subset into a second client signal path subset which is a subset of the client signal path set, by adding to the first client signal path subset an additional client signal path that has, as an end node thereof, the cost-optimum adjoining end node selected by the cost-optimum adjoining end node selecting step, and a first ring path expanding step of searching the network topology information for a second ring path which is a ring path including all nodes of the first ring path and a pair of end nodes of the additional client signal path, on a predetermined condition.

Accordingly, when a ring path capable of accommodating a set of client signal paths is given, the given ring path can be expanded so that a predetermined path cost condition is satisfied, and an expanded ring of an appropriate size can be efficiently obtained.

For example, according to the path cost condition, for each adjoining end node included in the adjoining end node set, a minimum path cost corresponding to the path from the adjoining end node to one of the nodes included in the first ring path where the path cost is the lowest is obtained, and the adjoining end node of the minimum path cost is selected from the adjoining end node set as a cost-optimum adjoining end node.

Alternatively, according to the path cost condition, for each adjoining end node included in the adjoining end node set, an expanded ring path including the adjoining end node included in the adjoining end node set and all end nodes of the client signal paths included in the first client signal path subset is searched for on a predetermined condition, an expanded ring path cost, which is the path cost of the entire expanded ring path, is calculated, and the adjoining end node of the minimum expanded ring path cost is selected from among the adjoining end nodes included in the adjoining end node set as a cost-optimum adjoining end node.

BRIEF DESCRIPTION OF THE DRAWINGS

FIG. 4 shows an example of a configuration of client signal path information according to the present invention;

FIG. 17 shows an example of cost assignment according to a second embodiment of the present invention.

FIG. 18 shows a second example of the configuration of the client signal path information according to the present invention.

FIG. 26 shows a third example of the process of searching for an expanded ring according to the second embodiment of the present invention.

DESCRIPTION OF THE PREFERRED EMBODIMENTS

Figure 1:
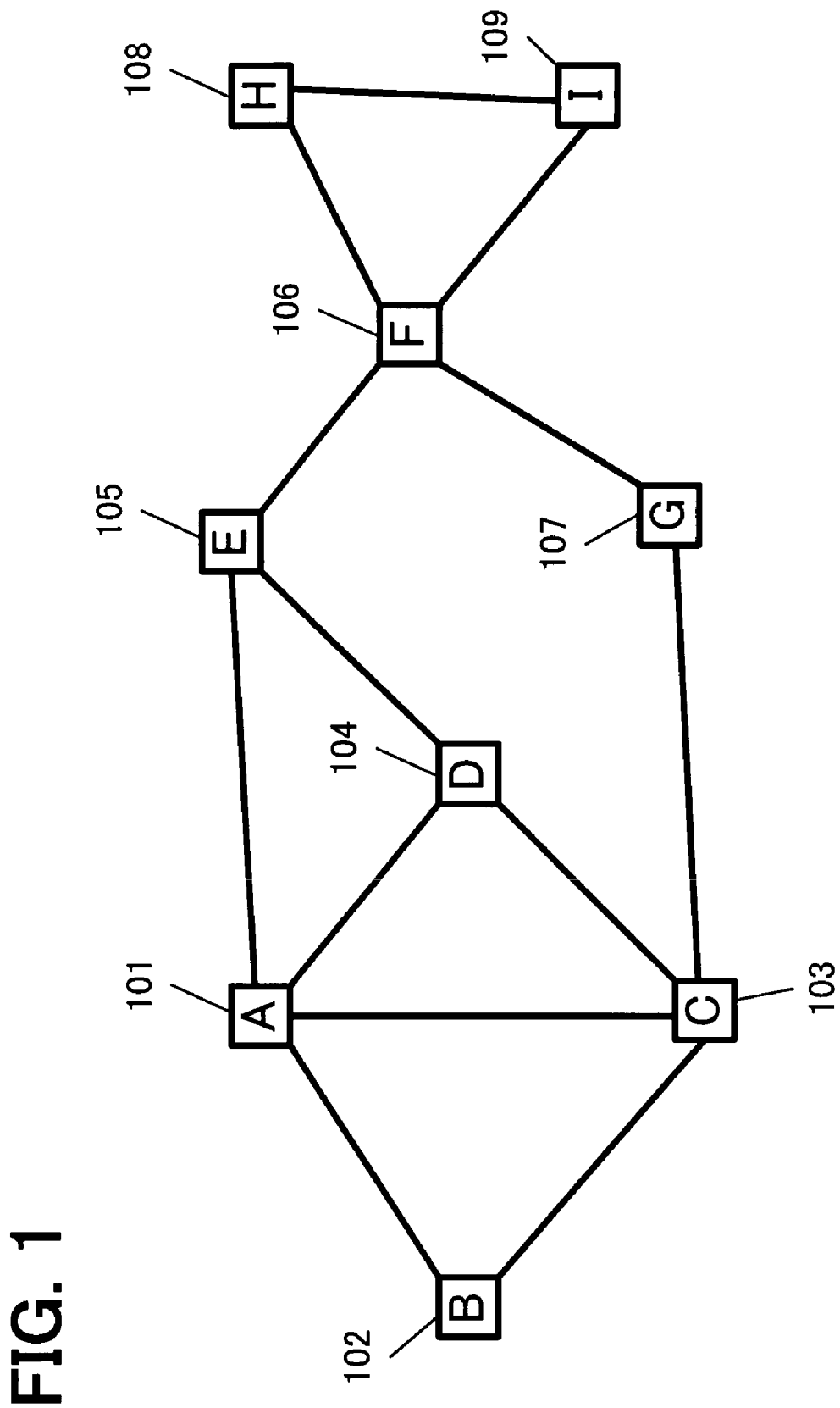
FIG. 1 shows an example a network topology of an optical network.

FIG. 1 shows an example of a network topology of an optical network.

The figure shows a connection relationship among nine nodes 101 to 109. The nine nodes 101 to 109 are attached with capital alphabet letters A to I for clarity. In the following description, the respective nodes are referred to by using these alphabet letters.

In a known optical network design, all ring topologies existing in a network topology are searched for and the search result is held. Then, in a stage of designing accommodation in an optical network such as a SONET network, a ring topology adapted to accommodate client signal paths of the SONET network is selected from among the held ring topologies.

However, the number of ring topologies included in the network topology is large. It can be easily estimated that the number of ring topologies increases as the number of nodes increases in a larger network scale. For example, ring topologies including nodes A and B are as follows: A-B-C-A; A-B-C-D-A; A-B-C-D-E-A; A-B-C-G-F-E-A; and A-B-C-G-F-E-D-A. If this is applied to all pairs of nodes, the number of ring topologies is huge.

In the embodiment of the present invention described below, an optical network having the network topology shown in FIG. 1 is described as a representative example for convenience of explanation.

Figure 14:
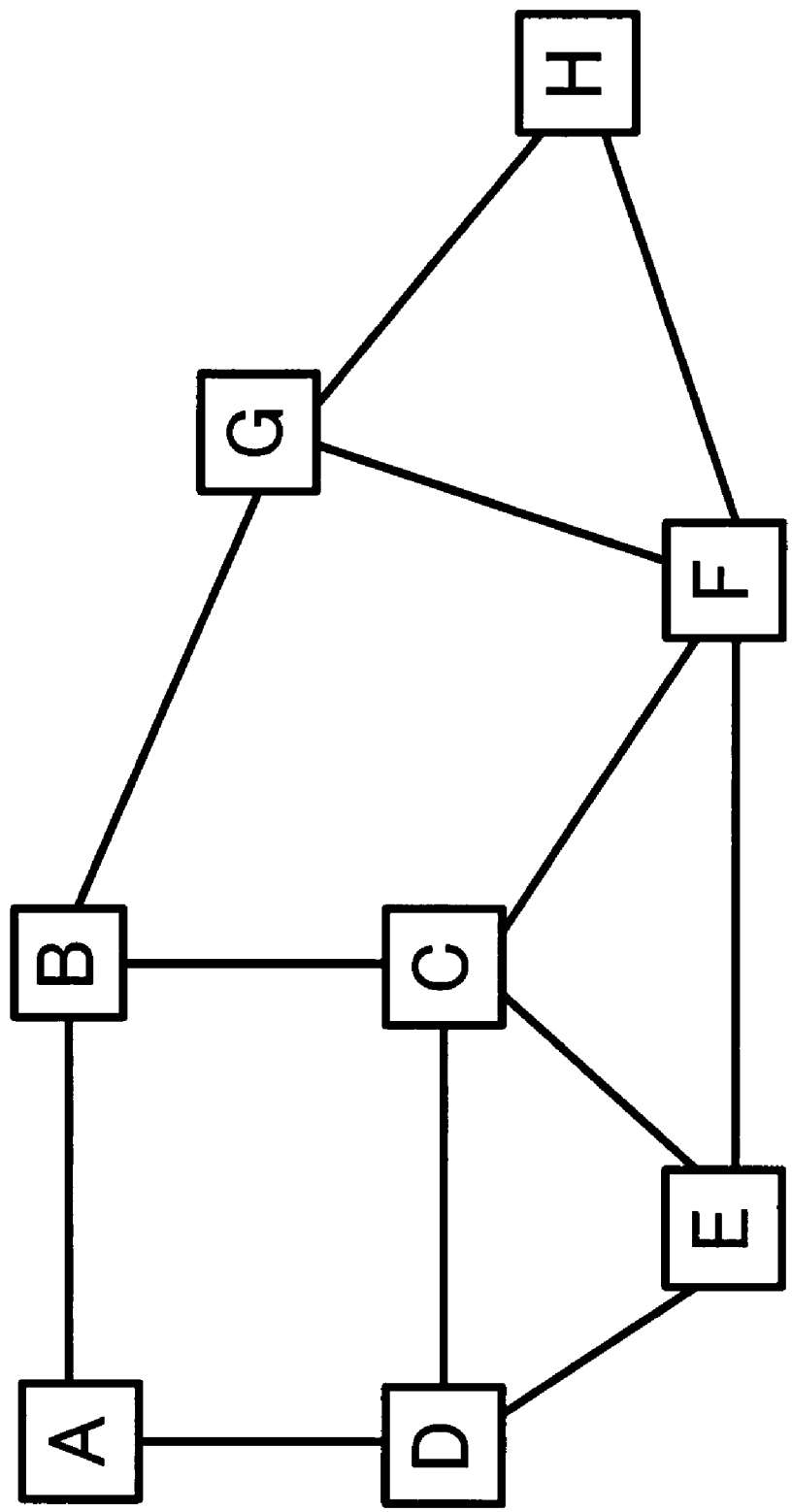
FIG. 14 shows a second example of the network topology of the network.

FIG. 14 shows a second example of the network topology of the optical network.

As a method for searching for a ring path on the basis of given network ring topology information, the following methods can be used. That is, since the accommodation efficiency of a ring network varies depending on where a ring path passes, all of possible ring paths in the network topology may be counted. Alternatively, among the possible ring paths, all ring paths except a ring path where no end nodes of client signal paths are included may be counted. The simplest method is generating a tree having stages, the number thereof being equal to the number of nodes on the topology added with one. Note that only a ring path passing the node selected as a root of the tree can be obtained by this method, and thus the same process needs to be repeated by using other nodes as a root.

Figure 15:
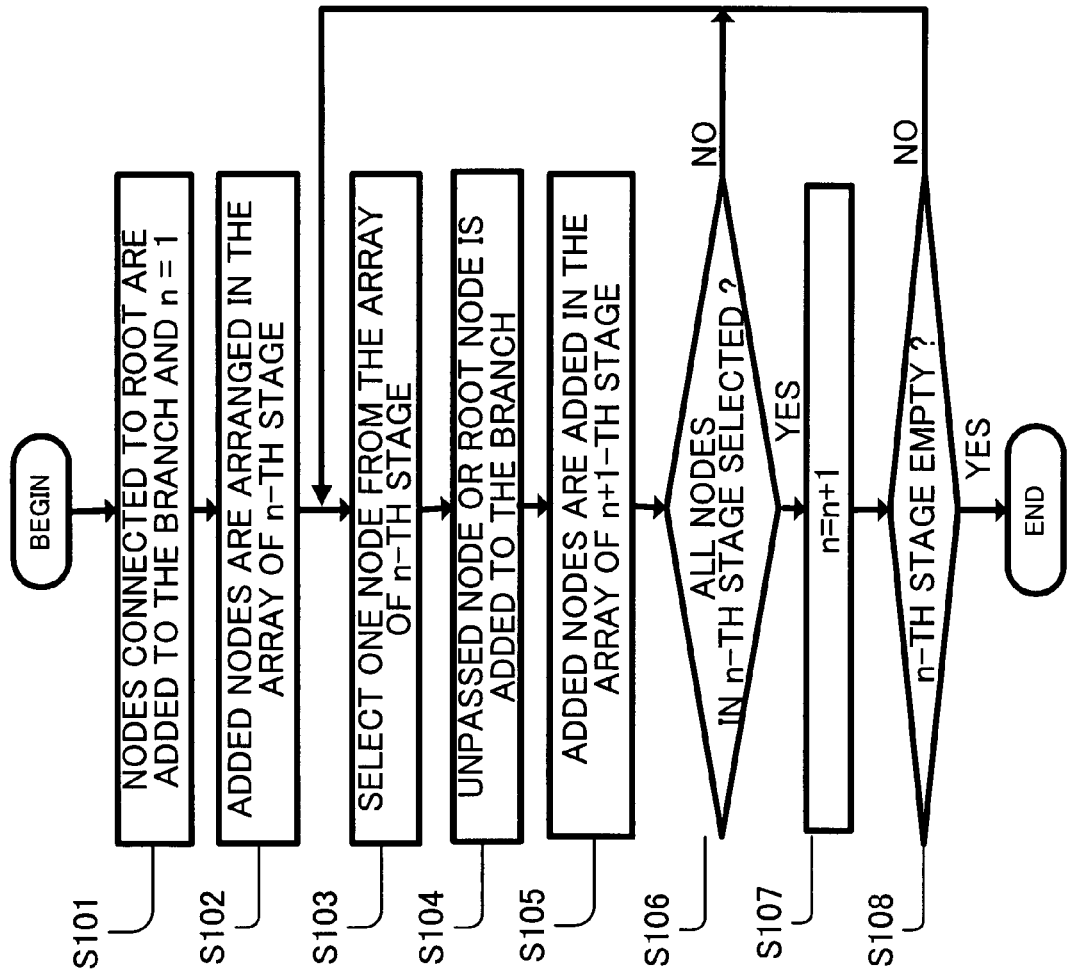
FIG. 15 shows an example of a process of searching for a ring path.
Figure 16:
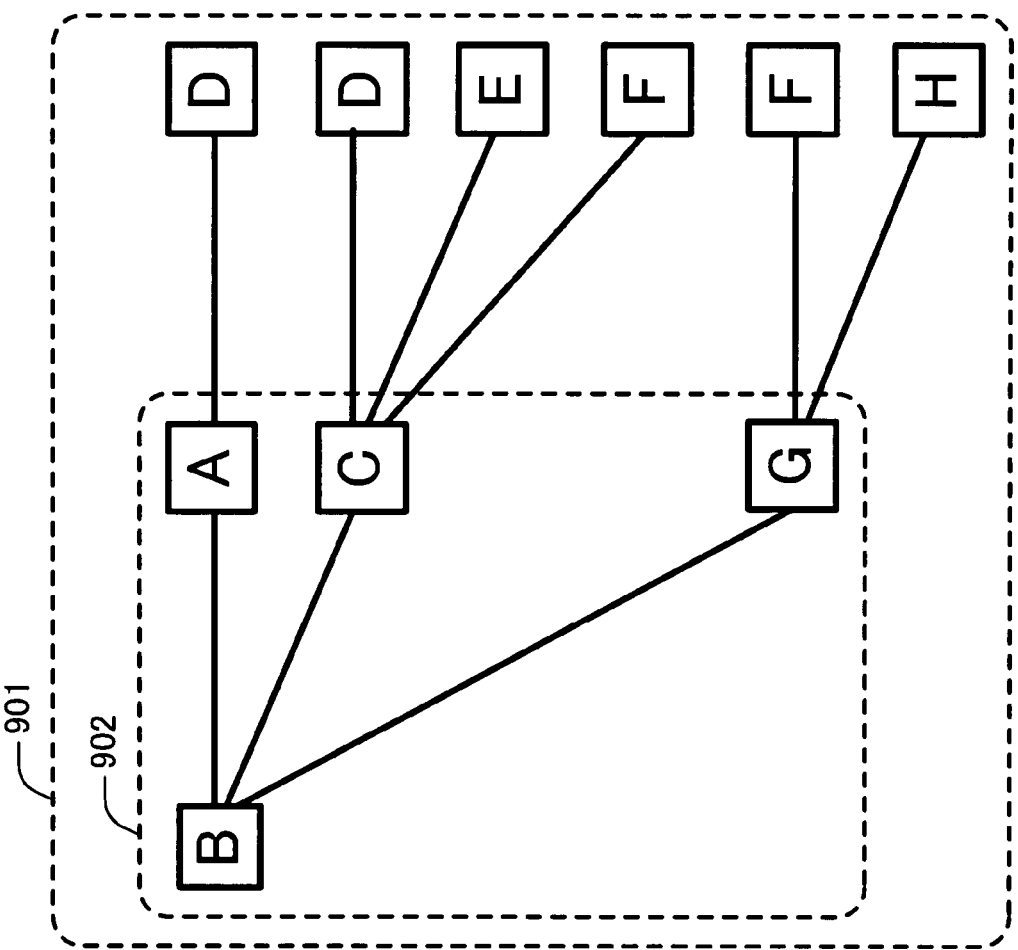
FIG. 16 shows an example of an order of searching for a ring path.

FIG. 15 shows an example of a process of searching for a ring path, that is, an example of the above-described method for searching for a ring path while generating a tree. FIG. 16 shows an example of an order of searching for a ring path and illustrates part of the tree that is generated when the method for searching for a ring path shown in FIG. 15 is performed on the network topology shown in FIG. 14. Herein, "n" represents the number of stages of the tree, and the number of stages of the nodes directly connected to the root is 1.

S101: The nodes connected to the root are added to branches and the stage number n of the tree is set to 1. In the example shown in FIG. 16, node B is regarded as the root, and nodes A, C, and G connected to node B are added to the branch of the stage number n (=1 in this case) of the tree.

S102: The added nodes are arranged in the array of the n-th stage. In the example shown in FIG. 16, nodes A, C, and G are arranged in the array of the first (1-th) stage. Accordingly, tree 902 shown in FIG. 16 is generated.

S103: One of the nodes is selected from the array of the n-th stage. In the example shown in FIG. 16, node A is selected from the array of the first stage.

S104: Among the nodes connected to the selected node, an unpassed node or the root node is added to the branches. In the example shown in FIG. 16, among the nodes connected to node A, an unpassed node or the root node other than the passed node B is added to the branches. In this case, node D is added.

S105: The node added in step S104 other than the root node is added in the array of the n+1-th stage. In the example shown in FIG. 16, node D is added in the array of the second (2-th) stage.

S106: It is determined whether all nodes in the array of the n-th stage have been selected. If selected (YES), the process proceeds to step S107. If not selected (NO), the process returns to step S103. In this way, steps S103 to S105 are performed on all nodes in the n-th stage. As a result, in the example shown in FIG. 16, nodes D, E, and F are added for node C and nodes D, E, and F are added in the array of the second stage. Likewise, nodes F and H are added to the branch for node G and are added in the array of the second stage. Accordingly, tree 901 shown in FIG. 16 is generated.

S107: All nodes in the array of the n-th stage have been selected, and thus the stage number n to be processed next is incremented by 1, that is, n=n+1. In the example shown in FIG. 16, n=2.

S108: It is determined whether the array of the n-th stage is empty. If empty (YES), the process ends. If not empty (NO), the process returns to step S103. In the example shown in FIG. 16, the array of the n-th (second) stage is not empty, and thus the process returns to step S103. When the root node is added as a branch, the root node cannot be added in the array of the n+1-th stage. Thus, the array of the n-th stage becomes empty when all branches reach the root or when there is no node to be selected, and the process ends.

The above-described process is for one root node, and needs to be performed on all nodes in the network topology. As can be expected from the above description, when a ring path is to be searched for on the basis of network topology information, enormous searching processes need to be performed as the number of nodes is larger and as the network scale is larger.

Figure 2:
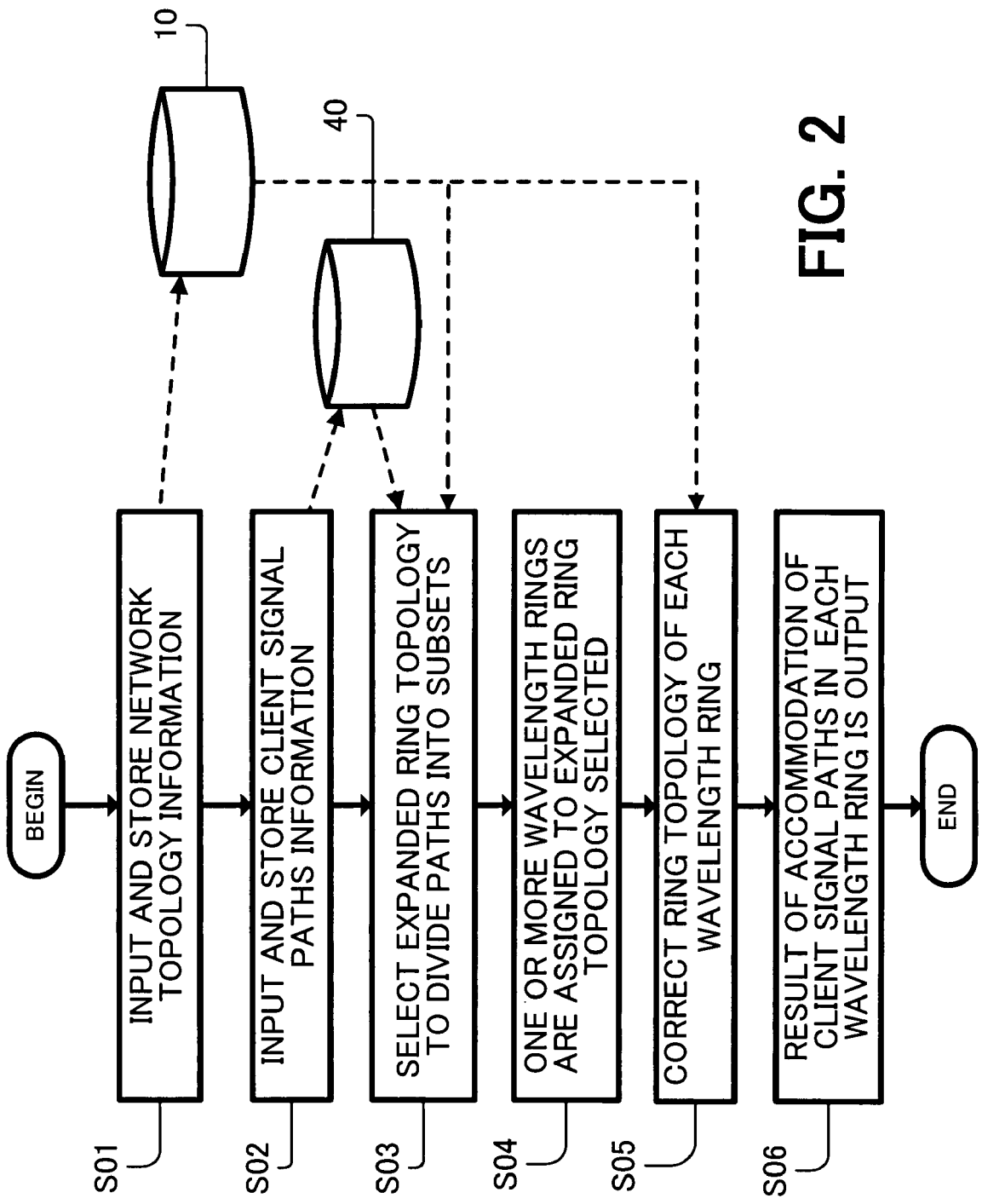
FIG. 2 shows an outline of a procedure of designing accommodation of client signal paths in an optical network according to the present invention.

FIG. 2 shows an outline of a procedure of designing accommodation of client signal paths in an optical network according to the present invention.

S01: Information about a connection relationship among nodes of the optical network (network topology information) is input and is held in a network topology information storing part 10. The input information includes identification information of nodes connected to each other and supplementary information that is required for determining a condition when a ring topology is searched for.

S02: Information about client signal paths to be accommodated in the optical network is input and is stored in a client signal path information storing part 40. The client signal path information includes identification information of end nodes and signal bands between the respective end nodes, where the end nodes mean transmission and reception nodes of each path.

S03: On the basis of the client signal path information stored in the client signal path information storing part 40, the client signal paths are divided into subsets of client signal paths, such that a ring topology (expanded ring topology) capable of accommodating all of the client signal paths included in each subset, whose size is the largest (including the largest number of client signal paths in the subset), is selected by searching the network topology information storing part 10 on a predetermined condition.

S04: One or more wavelength rings of predetermined bandwidths to accommodate the respective client signal paths are assigned to the expanded ring topology selected in step S03.

S05: In each of the wavelength rings assigned in step S04, the network topology information storing part 10 is searched again on the predetermined condition for a ring topology including end nodes accommodated in the wavelength ring. Then, the ring topology through which the wavelength ring passes is corrected to the selected ring topology. Then, the client signal paths are accommodated in a wavelength ring having the corrected ring topology.

S06: A result of accommodation of client signal paths in each wavelength ring is output.

As described above, in the method for designing an optical network according to the present invention, not all ring topologies that can exist in the optical network are searched for, unlike in the known method. Instead, a ring topology capable of accommodating a maximum number of client signal paths is searched for on the predetermined condition on the basis of the network topology information and is selected as an expanded ring topology, and wavelength rings of predetermined bandwidths to actually accommodate client signal paths are assigned to the expanded ring topology. Then, a ring topology capable of accommodating the end nodes of each wavelength ring is searched for on the predetermined condition on the basis of the network topology information, and the ring topology of the wavelength ring is corrected so that the wavelength ring is accommodated in the selected ring topology.

In this way, a load of searching for all ring topologies in the optical network can be reduced, and wavelength rings to optimally accommodate client signal paths can be assigned while considering a transmission characteristic.

Figure 3:
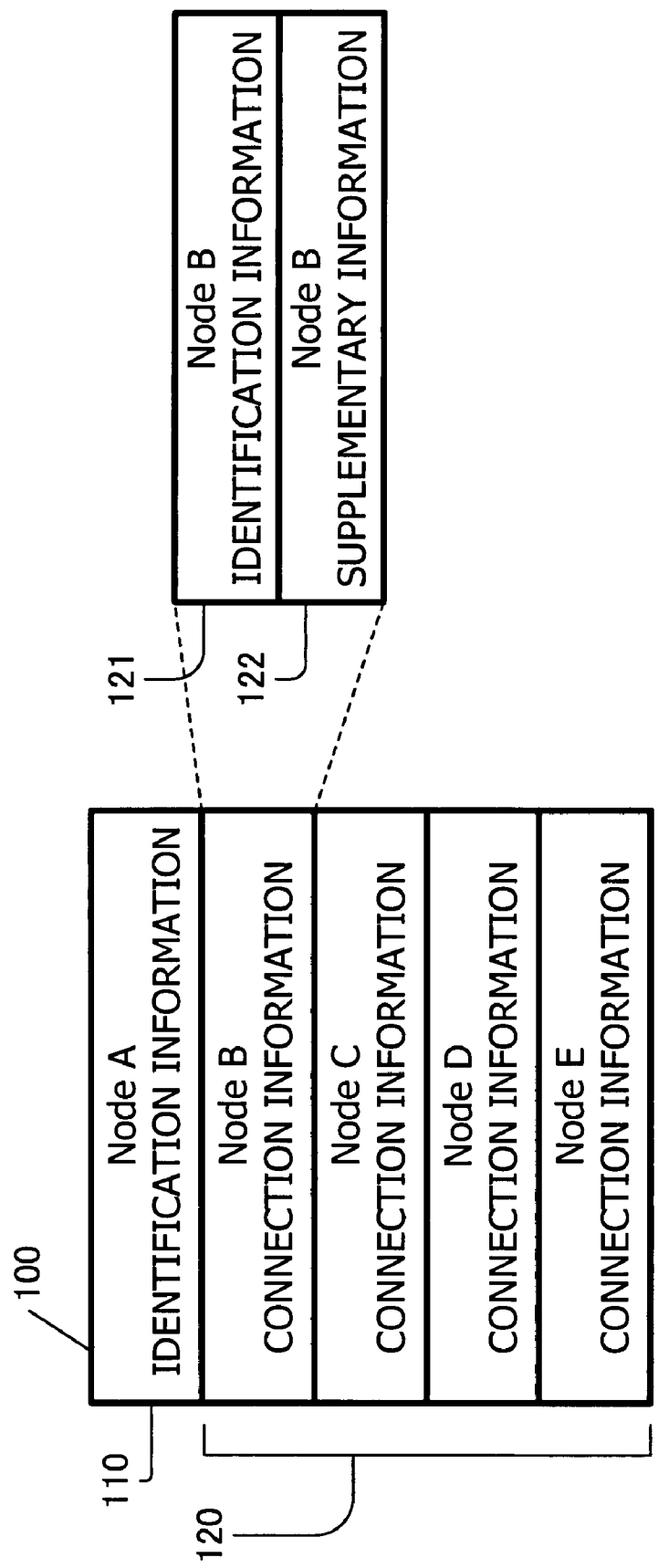
FIG. 3 shows an example of a configuration of a network topology information according to the present invention.

FIG. 3 shows an example of a configuration of the network topology information according to the present invention.

The network topology information is information defining a connection relationship among nodes in the optical network. In other words, the network topology information defines the correspondence between respective nodes connected through optical fibers or the like.

A network topology information storing part 10 is configured as, for example, a set of records storing identification information of each node and connection information between the node and nodes connected thereto.

FIG. 3 shows, as a representative example, a record defining connection information about the node A in the information defining the network topology shown in FIG. 1.

A record 100 includes identification information 110 of a node and connection information 120 about nodes connected thereto. In this example, the identification information 110 about the node A and the connection information 120 about the nodes B, C, D, and E connected to the node A are shown as an example.

Connection information 120 is a set of identification information 121 of each connected node and supplementary information 122 thereof. The length of the connection information 120 varies depending on the number of connected nodes. A weight value of a distance of a connection link between the nodes connected to each other can be set as the supplementary information 122 of the connected node. Accordingly, a weighted distance of a ring topology can be calculated, and a ring topology can be searched for on the condition that the weighted distance is the shortest. Herein, by setting the weight values of the respective connection links to "1", the smallest number of total hops can be used as the predetermined condition to search for a ring topology.

By setting an OSNR value to the supplementary information 122 of the connected node, the largest OSNR value can be used as the predetermined condition to search for a ring topology.

In the configuration shown in FIG. 3, the length of the connection information 120 of connected nodes is variable. Thus, the length of the record 100 is also variable depending on the number of nodes connected, and the number of records increases as the network scale becomes larger. Therefore, if all ring topologies that can exist in the network topology are to be searched for, a process of sequentially searching the variable-length record and tracing all nodes connected to each node needs to be repeated, which involves an enormous amount of search and process. In the present invention, the nodes to be searched for in the network topology information are narrowed down on the basis of the client signal path information, so that the network can be efficiently designed.

Hereinafter, a first embodiment of the present invention is described with reference to FIGS. 4 to 13 by using the first example of the network topology shown in FIG. 1 as a representative example.

FIG. 4 shows an example of a configuration of the client signal path information according to the present invention. In this example, a set of all client signal paths to be accommodated in the designed optical network is represented as a client signal path list 40 that can be easily processed in a computer. This list 40 serves as an embodiment of the client signal path information storing part 40 shown in FIG. 2.

Each client signal path information used to design accommodation in the optical network can includes identification information of a transmitting end node and a receiving end node of traffic (hereinafter referred to as end nodes) and a traffic volume between the end nodes. Herein, the traffic volume is represented by the product of a signal bandwidth and the number of traffic paths between a pair of end nodes.

Each entry in the client signal path list 40 corresponds to a client signal path.

No 401 is identification information of respective client signal path. In this example, identification information D01 to D06 is assigned to six client signal paths.

Reference numerals 402 and 403 denote end nodes corresponding to transmitting end nodes and receiving end nodes, respectively. A traffic volume 404 shows a traffic volume between the end nodes 402 and 403. The traffic volume is represented by a multiplexing unit of SONET.

A processed flag 405 is flag information indicating whether a process of selecting an expanded ring topology (described below) has been performed in each entry of the client signal path list 40.

A non-accommodatable flag 406 is flag information indicating whether a ring topology satisfying a predetermined condition has been selected in the process of selecting an expanded ring topology (described below) in each entry of the client signal path list 40.

For example, an entry 201 in the client signal path list 40 corresponds to a client signal path D01 between end nodes A and B, and the traffic volume thereof is OC-48$x$2. Herein, OC-48 is one of multiplexing levels in SONET standing for "Optical Carrier Level 48", and corresponds to a traffic volume of a bit rate of 2.48832 Gbps.

Likewise, an entry 202 corresponds to a client signal path D02 between end nodes D and E, and the traffic volume thereof is OC-48$x$1. An entry 203 corresponds to a client signal path D03 between end nodes B and D, and the traffic volume thereof is OC-48$x$1. An entry 204 corresponds to a client signal path D04 between end nodes G and F, and the traffic volume thereof is OC-48$x$1. An entry 205 corresponds to a client signal path D05 between end nodes F and H, and the traffic volume thereof is OC-48$x$1. An entry 206 corresponds to a client signal path D06 between end nodes C and E, and the traffic volume thereof is OC-48$x$1.

In this example, an initial value "0" is set in the processed flag 405 and the non-accommodatable flag 406. However, the values of these flags change during the process of selecting an expanded ring topology (described below).

Figure 5:
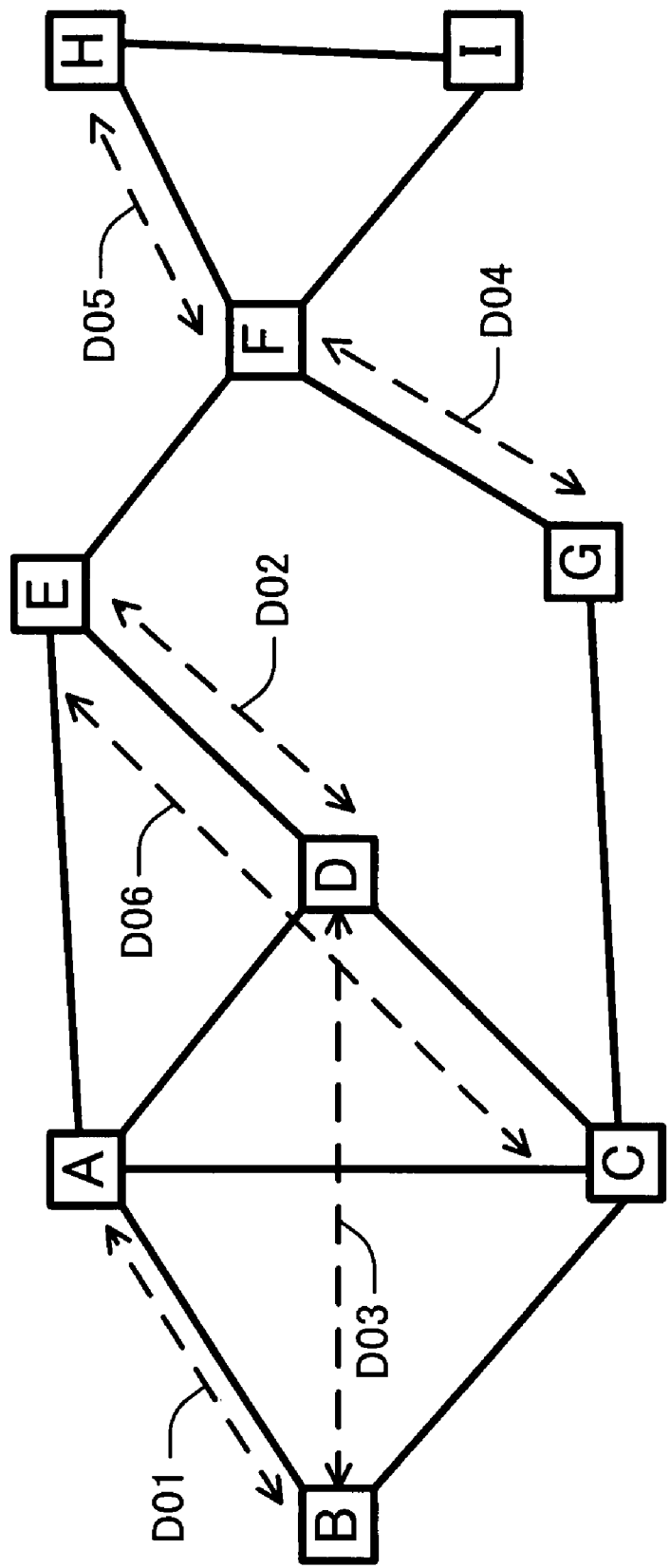
FIG. 5 shows client signal paths of the present invention associated with the network topology.

FIG. 5 shows the client signal path information shown in FIG. 4 associated with the network topology.

In order to clarify the correspondence with the client signal paths D01 to D06 shown in FIG. 4, the client signal paths D01 to D06 are indicated by broken-line arrows denoted by reference symbols D01 to D06, respectively. As can be understood by the broken-line arrow D03 indicating the client signal path D03, a client signal path simply shows a pair of end nodes (e.g., nodes B and D in this case) of traffic before an accommodating stage, and does not show a traffic path through which actual traffics flow. Thus, there can typically exist a plurality of traffic paths to realize a client signal path, but one of the traffic paths is determined to the client signal path in the accommodating stage.

Figure 6:
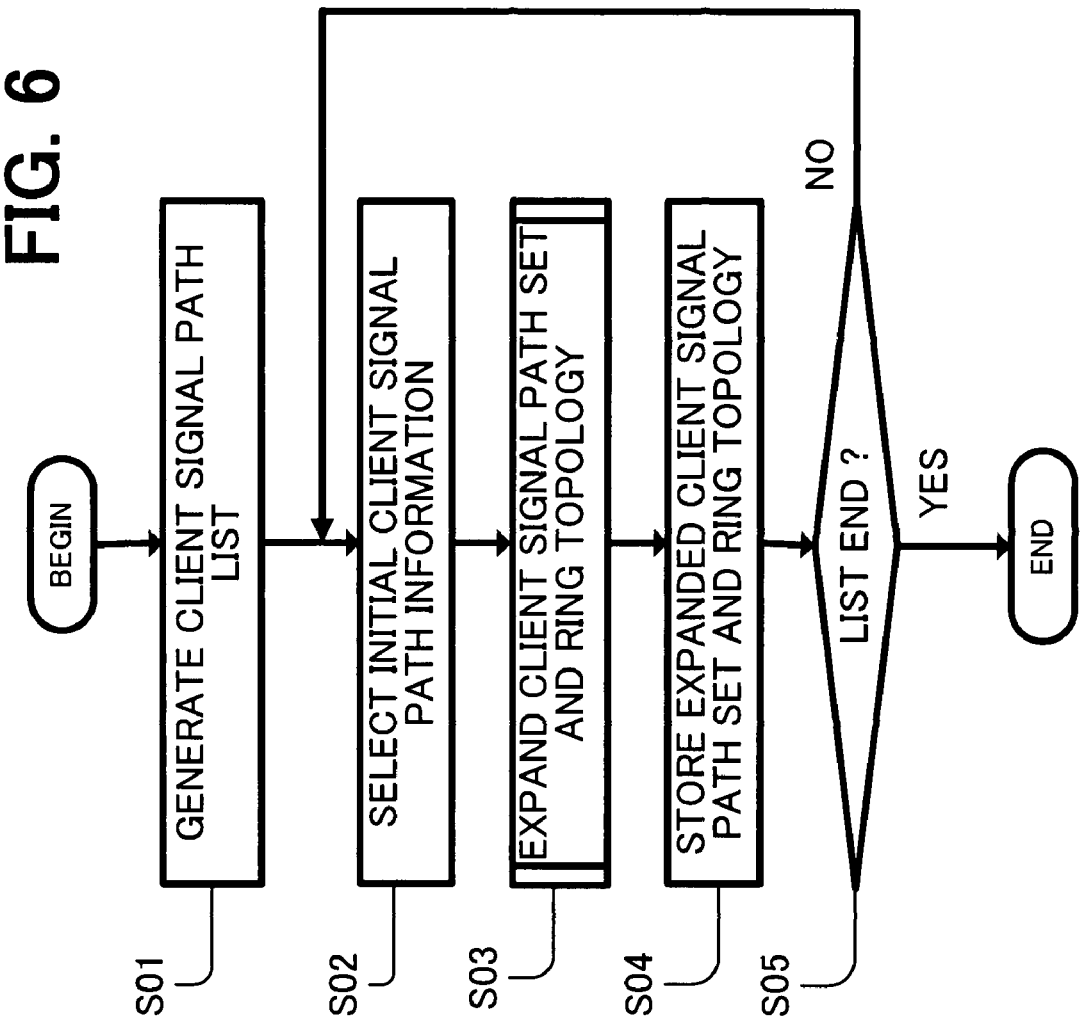
FIG. 6 is a flowchart showing a procedure of selecting an expanded ring topology according to a first embodiment of the present invention.

FIG. 6 is a flowchart showing a procedure of selecting an expanded ring topology according to the present invention, where an expanded ring topology capable of accommodating the largest number of client signal paths at one time is selected on the basis of the client signal path list 40 shown in FIG. 4.

In step S01, a client signal path list showing client signal path information of an input SONET signal is generated. Herein, as in the client signal path list 40 shown in FIG. 4, pieces of client signal path information are listed in descending order of a traffic volume between respective end nodes. Alternatively, the pieces of client signal path information may be listed in ascending order of a traffic volume or in descending/ascending order of the total number of traffic paths realizing a client signal path.

The processed flag 405 and the non-accommodatable flag 406 in the client signal path list 40 are initialized (e.g., set to "0").

In step S02, the top entry among entries where the processed flag 405 is set to "0" in the client signal path list 40 is regarded as initial client signal path information.

In step S03, the network topology information storing part 10 is searched on a predetermined condition so as to select an expanded ring topology. The process of selecting an expanded ring topology is described below in detail with reference to FIG. 7.

The processed flag 405 of the entry that has been processed in the process of selecting an expanded ring topology is set to ON ("1"), and the entry with the processed flag 405 ON is eliminated from the process thereafter.

A set of client signal paths corresponding to the entries processed in this process of selecting an expanded ring topology (subset of client signal paths) can be accommodated in one expanded ring topology selected here. The subset of client signal paths is the largest subset of client signal paths that cannot be expanded any more (expanded subset of an initial client signal path), as described below in FIG. 7.

In step S04, information about the expanded subset of client signal paths obtained by the process of selecting an expanded ring topology in step S03 and information about the corresponding expanded ring are held.

Alternatively, if a result of the process of selecting an expanded ring topology is non-accommodatable, the result may be notified to an operator.

In step S05, whether all of the entries in the client signal path list 40 have been processed is determined on the basis of the processed flag 405. If there is an unprocessed entry (NO), the process returns to step S02. If all of the entries have been processed (YES), the process ends.

With the above-described process, the set of all client signal paths to be accommodated in the optical network is divided into expanded subsets of client signal paths. Each expanded subset of client signal paths can be accommodated in a corresponding expanded ring topology.

Figure 7:
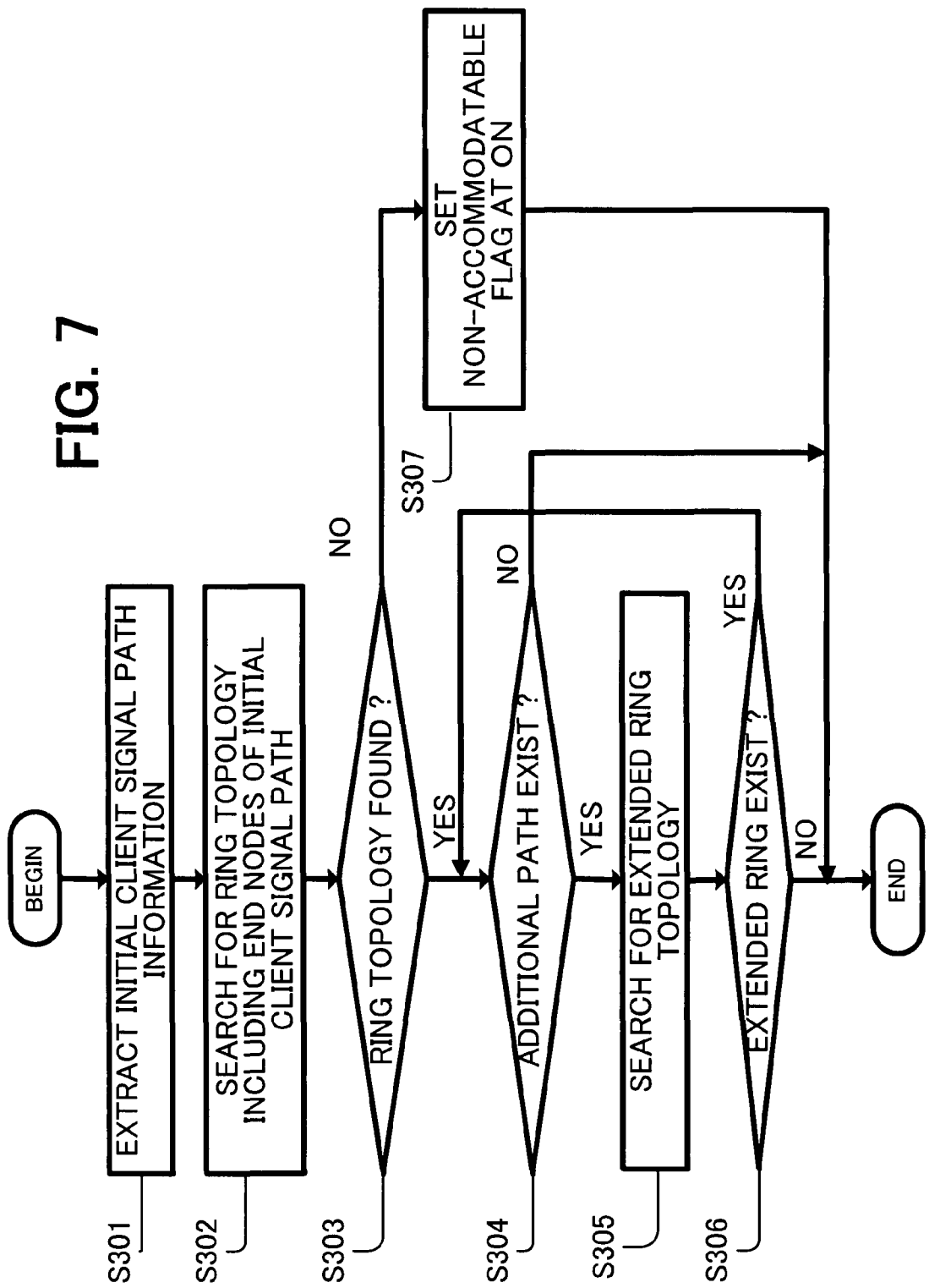
FIG. 7 is a flowchart showing a process of selecting an expanded ring topology according to the first embodiment of the present invention.

FIG. 7 is an example of a flowchart showing a process of selecting an expanded ring topology according to the first embodiment of the present invention, where the details of step S03 (the process of selecting an expanded ring topology) in the procedure shown in FIG. 6 is described.

In step S301, initial client signal path information, which is set at a call of this process, is extracted from the client signal path list 40 and is held.

In step S302, the network topology information storing part 10 is searched on the predetermined condition for a ring topology including the end nodes indicated by the initial client signal path information. At the same time, the processed flag of the corresponding entry in the client signal path list 40 is set to "1".

The predetermined condition can be, for example, any of the following three conditions (a), (b), and (c).

(a) Connection links between the respective nodes in the optical network are weighted, and the distance of a ring topology calculated on the basis of the weight is the shortest.

(b) The total number of hops in the ring topology is the smallest.

(c) OSNR of the ring topology is the largest.

In step S303, if the corresponding ring topology is not found in the search in step S302 (NO), the process proceeds to step S307. If the corresponding ring topology is found (YES), information about the ring topology is held as found ring topology information, and the process proceeds to step S304.

In step S304, among the unprocessed entries (entries in which processed flag is "0") in the client signal path list 40, additional client signal path information including as end node at least one of the end nodes of the ring topology indicated by the found ring topology information is searched for.

If the additional client signal path information is found (YES), the information is extracted and the process proceeds to step S305. If the additional client signal path information is not found (NO), the process ends.

In step S305, the network topology information storing part 10 is searched on the predetermined condition for a ring topology including the nodes of the ring topology indicated by the found ring topology information and the end nodes indicated by the second client signal path information found in step S304. At the same time, the processed flag is set to "1".

In step S306, if the corresponding ring topology is found in step S305 (YES), information about the ring topology is held as found ring topology information and the process returns to step S304. If the ring topology is not found (NO), the process ends.

By repeating steps S304 to S306, the ring topology including the end nodes in the first client signal path information can be expanded by adding unprocessed client signal paths.

In step S307, the non-accommodatable flag of the corresponding entry is set to ON (e.g., to "1"), and the process ends.

In the process of selecting an expanded ring topology shown in FIG. 7, it is first determined whether there exist ring topologies including end nodes indicated by the client signal path information selected in a predetermined method (the first client signal path information). If the ring topologies exist, a ring topology satisfying the predetermined condition is selected from among the ring topologies. Then, a client signal path including at least one of the nodes of the selected ring topology is added, and a ring topology that includes the end node of the added client signal path and that satisfies the predetermined condition is searched for. This process is repeated to expand the ring topology so that the ring topology includes the end nodes of as many pieces of client signal path information as possible in the client signal path list 40.

As a result, a ring topology that includes the end nodes shown in the first client signal path information and that satisfies the predetermined condition while reflecting the client signal path information in the client signal path list 40 to the maximum extent, is selected. In this specification, a set of the client signal paths generated in this manner is defined as an expanded subset of client signal paths. A ring topology satisfying the predetermined condition corresponding to the expanded subset of client signal paths is defined as an expanded ring topology.

The above-described search for a ring topology is continued until all of the entries in the client signal path list 40 have been processed. Note that, if a ring topology that includes the end nodes indicated by the first client signal path information and that satisfies the predetermined condition does not exist, it is determined that the client signal path corresponding to the client signal path information cannot be accommodated. At this time, a network designer may be notified that the client signal path cannot be accommodated.

Figure 8:
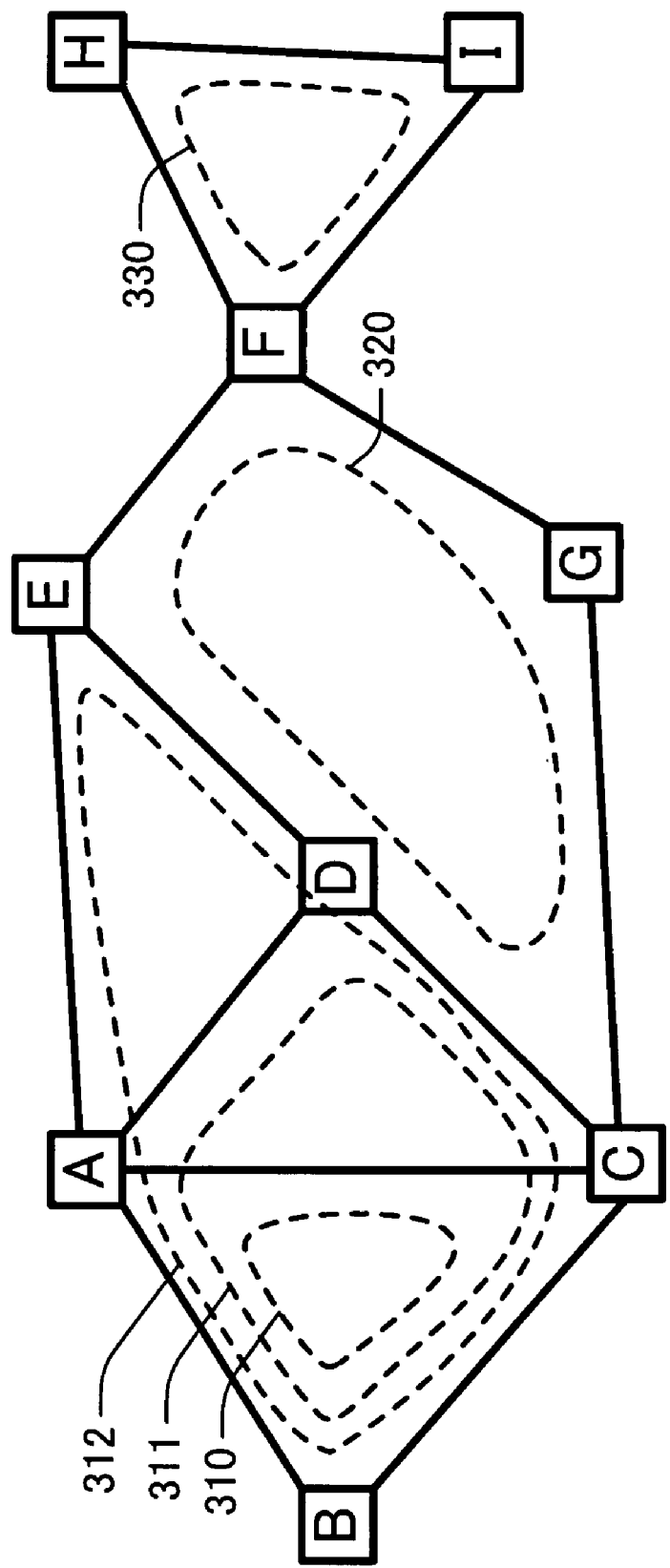
FIG. 8 shows a process of selecting an expanded ring topology according to the first embodiment of the present invention.

FIG. 8 shows a process of selecting an expanded ring topology according to the first embodiment of the present invention. In the figure, broken lines indicate a process where the ring topology that is searched for on the predetermined condition expands during the process of selecting an expanded ring topology described above with reference to FIGS. 6 and 7. Hereinafter, the process of selecting an expanded ring topology on the basis of the client signal path list 40 shown in FIG. 4 is described in the following (1) to (4), in accordance with the order of the steps.

(1) First, the client signal path D01 in the client signal path list 40 is selected as a first client signal path, and a ring topology including the end nodes A and B thereof is searched for on the predetermined condition on the basis of the network topology information storing part 10. Accordingly, a ring topology 310 is found, so that the processed flag 405 of the client signal path D01 is set to ON ("1"). At this time, the method described in the following document can be applied as an algorithm of searching for a ring topology including the end nodes A and B.

Optimal Physical Diversity Algorithms and Survivable Networks" (Ramesh Bhandari, Proceedings of the $2^{nd}$ IEEE Symposium on Computers and Communications (ISCC '97)

(2) Then, a client signal path (second client signal path) including at least one of the end nodes A and B of the client signal path D01 included in the ring topology 310 is searched for from the top in the client signal path list 40. In this case, among the end nodes B and D of the entry 203, the node B is included in the ring topology 310, so that the client signal path D03 is selected.

(3) A ring topology which includes the end nodes A and B of the client signal path D01 included in the ring topology 310 and includes the end nodes B and D indicated by the client signal path information D03, that is, a ring topology including the end nodes A, B, and D, is searched for on the predetermined condition in the network topology information storing part 10, so that a ring topology 311 is obtained. At this time, the processed flag 405 of the client signal path information D03 is set to ON ("1").

(4) Since the ring topology 311 was found in process (3), a client signal path (a second client signal path) including an end node that matches any of the end nodes A, B, and D (indicated by the client signal path D01 and D03) and is included in the ring topology 311 is searched for among the unprocessed entries in the client signal path list 40.

(5) In this case, the client signal path D02 (end nodes: D and E) is selected. Then, the network topology information storing part 10 is searched on the predetermined condition for a ring topology including the end nodes A, B, and D of the client signal path information D01 and D03 included in the ring topology 311 and the end nodes D and E of the client signal path D03, so that a ring topology 312 is obtained. At this time, the processed flag of the client signal path information D02 is set to ON ("1").

(6) Since the ring topology 312 was found in process (5), client signal path (second client signal path) including an end node that matches any of the nodes A, B, D, and E of the client signal path D01, D02, and D03 included in the ring topology 312 is searched for among the unprocessed entries in the client signal path list 40.

In this case, the client signal path D06 (end nodes: C and E) is selected. Then, the network topology information storing part 10 is searched on the predetermined condition for a ring topology including the end nodes A, B, D, and E of the client signal paths D01, D02, and D03 included in the ring topology 312 and the end nodes C and E of the client signal path D06. However, since the ring topology 312 includes the end nodes C and E of the client signal path D06, the ring topology 312 is obtained as a search result. At this time, the processed flag of the client signal path D06 is set to ON ("1").

(7) Since the ring topology 312 was found in process (6), a client signal path (second client signal path) including an end node that matches any of the end nodes A, B, C, D, and E (of the client signal path information D01, D02, D03, and D06) which are included in the ring topology 312, is searched for among the unprocessed entries in the client signal path list 40.

However, since an unprocessed entry including any of the nodes A, B, C, D, and E does not exist in the client signal path list 40, the process of searching for a ring topology once ends.

Herein, all of the nodes A, B, C, D, and E existing in the expanded ring topology 312 are compared with the end nodes A, B, C, D, and E of the client signal paths D01, D02, D03, and D06 included in the expanded ring topology 312. At this time, the nodes on both sides match, and thus an expanded subset of client signal paths including the client signal paths D01, D02, D03, and D06, and the expanded ring topology 312 can be obtained.

(8) Then, it is determined whether the client signal path list 40 has an unprocessed entry. In this case, unprocessed entries 204 and 205 exist, and thus a process of selecting an expanded ring topology is performed by regarding the client signal path D04 of the top unprocessed entry 204 in the client signal path list 40 as first client signal path. As a result, a ring topology 320 that includes the end nodes G and F of the client signal path D04 and that satisfies the predetermined condition is found in the network topology information storing part 10. At the same time, the processed flag of the entry 204 is set to ON ("1").

Since an unprocessed client signal path (second client signal path) including any of the end nodes G and F of the client signal path included in the ring topology 320 does not exist, the process of searching for a ring topology once ends.

Comparing all of the nodes C, D, E, F, and G existing in the expanded ring topology 320 with the end nodes G and F of the client signal path D04 included in the expanded ring topology 320, only the nodes G and F are common to the both sides.

If the both sides do not match, an unprocessed client signal path (second client signal path) including any of the nodes C, D, E, F, and G existing in the expanded ring topology 320 is searched for among the unprocessed entries in the client signal path list 40.

Since the unprocessed client signal path (second client signal path) including any of the nodes C, D, E, F, and G existing in the expanded ring topology 320 does not exist, an expanded subset of client signal paths including only the client signal path D04 as an element and the expanded ring topology 320 can be obtained.

(9) Then, client signal path (first client signal path) of the top unprocessed entry in the client signal path list 40 is selected.

Herein, the client signal path D05 is selected. Thus, the network topology information storing part 10 is searched on the predetermined condition for a ring topology including the end nodes F and H of the client signal path D05. Accordingly, a ring topology 330 is selected, so that the processed flag of the client signal path D05 is set to ON ("1").

(10) There is no unprocessed entry in the client signal path list 40 and second client signal path does not exist any more. Thus, the process of searching for a ring topology once ends.

At this time, an expanded subset of client signal paths including only the client signal path D05 as an element and the expanded ring topology 330 can be obtained.

(11) In the above-described process, all of the entries in the client signal path list 40, that is, the entire client signal path information, has been processed, and the process ends.

Figure 9:
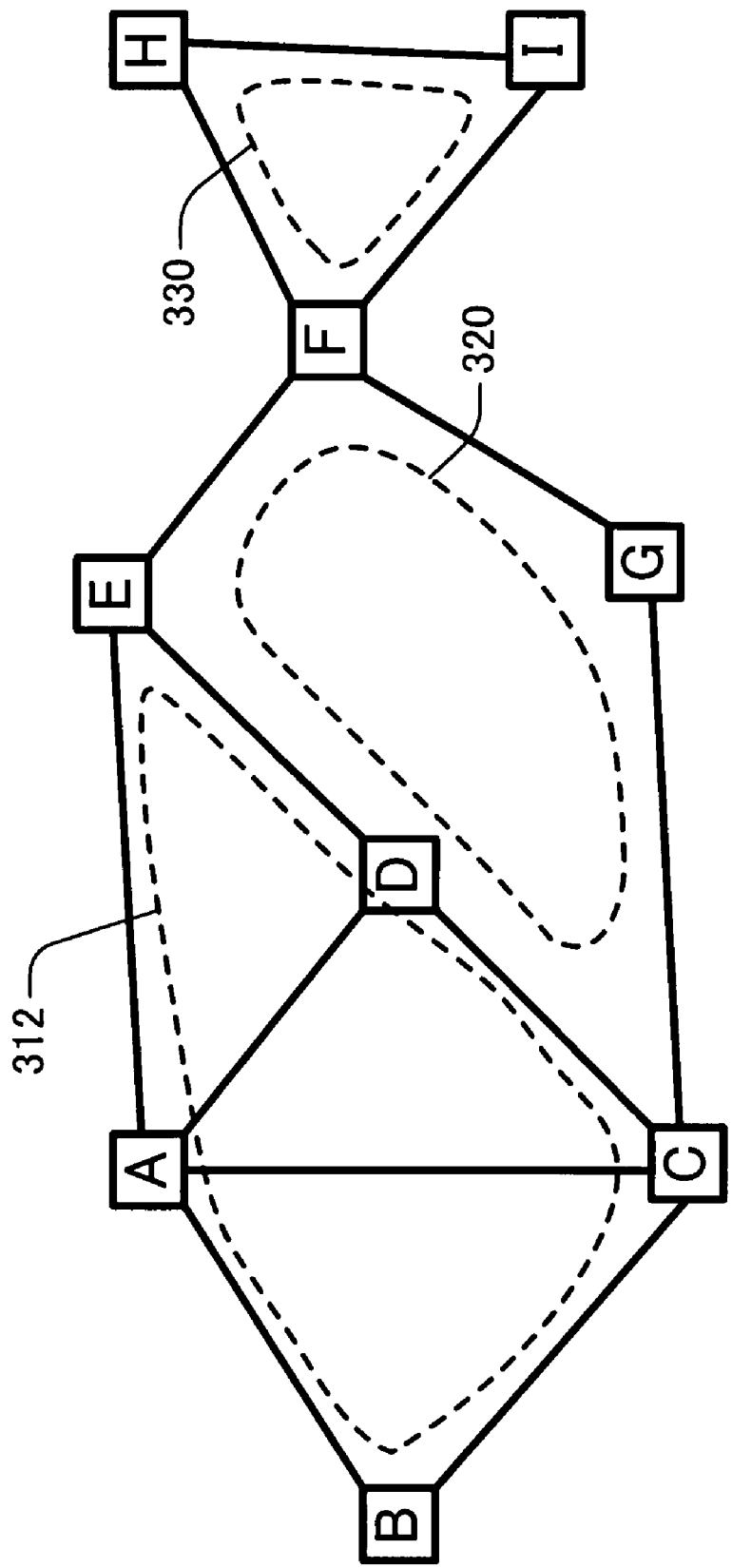
FIG. 9 shows an example of expanded ring topologies that are eventually selected in the procedure of selecting an expanded ring topology according to the first embodiment of the present invention.

FIG. 9 shows expanded ring topologies that have eventually been selected in the above-described procedure, according to the first embodiment of the present invention. In the figure, three expanded ring topologies 312, 320, and 330 are selected.

The expanded ring topology 312 is a ring topology of A-B-C-D-E-A; the expanded ring topology 320 is a ring topology of C-G-F-E-D-C; and the expanded ring topology 330 is a ring topology of F-I-H. The client signal paths that can be accommodated in the expanded ring topology 312 are four client signal paths D01, D02, D03, and D04. The client signal path that can be accommodated in the expanded ring topology 320 is the client signal path D04. The client signal path that can be accommodated in the expanded ring topology 330 is the client signal path corresponding to the client signal path D05.

FIGS. 10A to 10D illustrate assignment of a wavelength ring and accommodation of client signal paths in an expanded ring topology, according to the first embodiment of the present invention.

The figures show a method for accommodating the respective client signal paths shown in the client signal path list 40 in FIG. 4 by assigning them to a wavelength ring of a predetermined bandwidth passing the expanded ring topologies shown in FIG. 9.

Herein, the wavelength ring has, for example, a predetermined bandwidth of 10 Gbps, and the expanded ring topology 312 among the expanded ring topologies shown in FIG. 9 is described as a representative example.

In FIGS. 10A to 10D, traffic flows T01 and P01 correspond to the client signal path D01 in the client signal path list 40; traffic flows T02 and P02 correspond to the client signal path D02; traffic flows T03 and P03 correspond to the client signal path D03; and traffic flows T06 and P06 correspond to the client signal path D06.

The solid-line arrows T01, T02, T03, and T06 indicate traffic flows in a normal mode, whereas the broken-line arrows P01, P02, P03, and P06 indicate traffic flows in a protection mode corresponding to the traffic flows T01, T02, T03, and T06 in the normal mode. The following description is made on the assumption of a case of UPSR (uni-directional path switched ring) of a SONET ring for convenience.

First, the traffic volume 404 of each client signal path is checked by referring to the client signal path list 40 shown in FIG. 4.

Figure 10A:
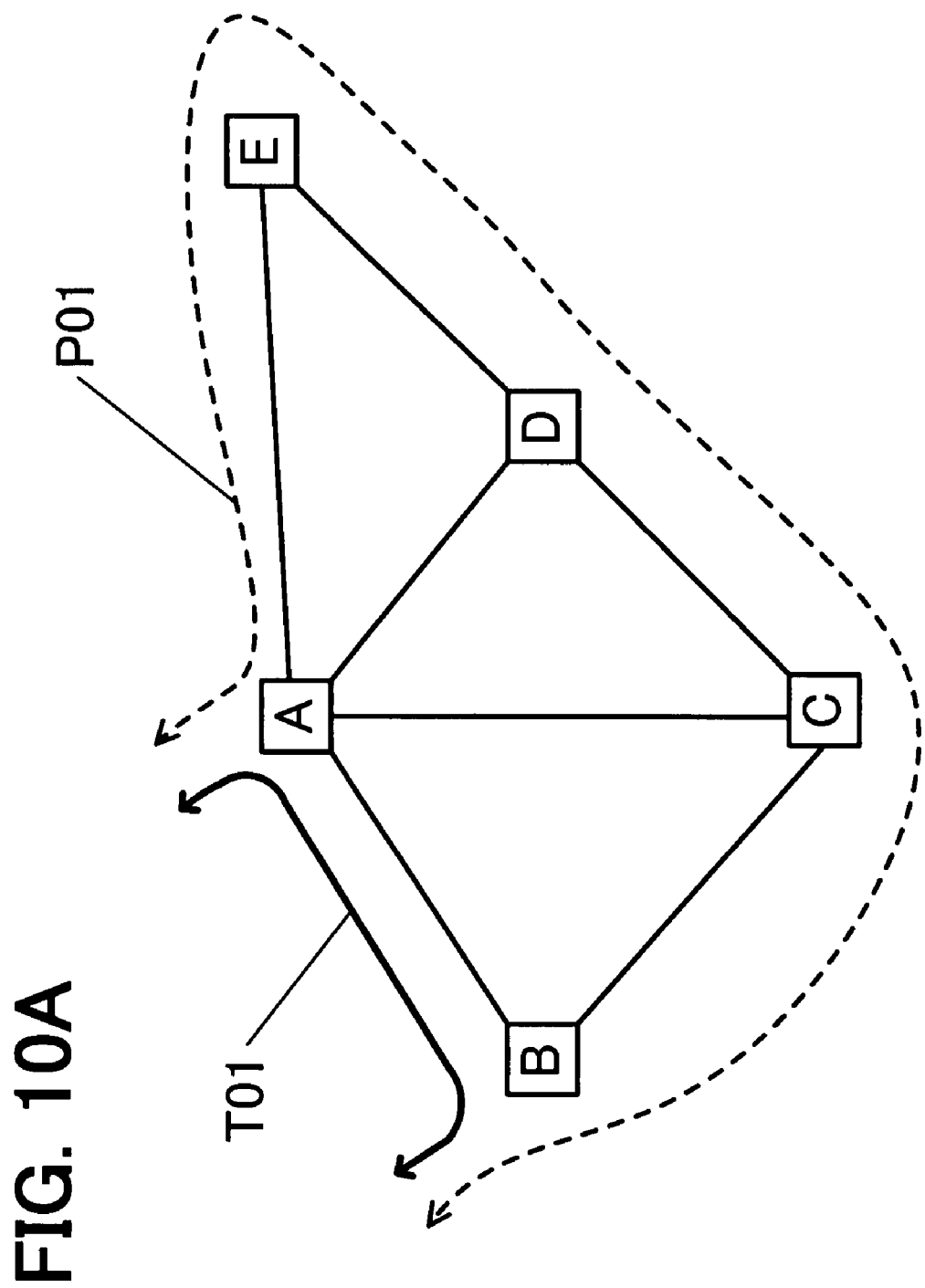
FIGS. 10A to 10D illustrate an example of assignments of a wavelength ring and accommodation of client signal paths in an expanded ring topology according to the first embodiment of the present invention.

FIG. 10A shows the traffic flow T01 in the normal mode and the traffic flow P01 in the protection mode corresponding to the client signal path D01. As can been understood by the traffic flows shown in the figure, the path (OC-48x2) corresponding to the traffic volume of the client signal path D01 needs to be accommodated in a ring shape in order to accommodate the client signal path D01.

Figure 10B:
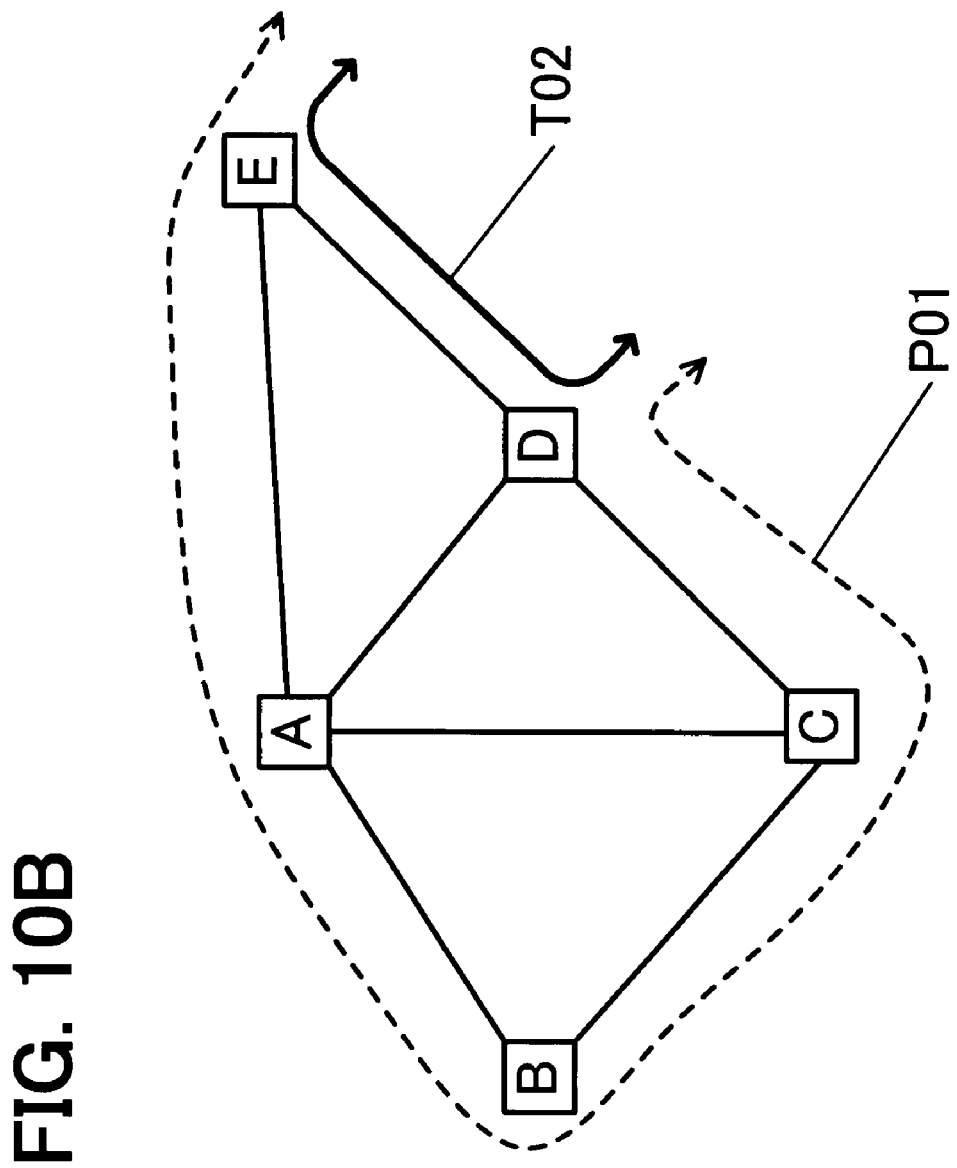

FIG. 10B shows the traffic flow T02 in the normal mode and the traffic flow P02 in the protection mode corresponding to the client signal path D02. The path (OC-48x1) corresponding to the traffic volume of the client signal path D02 needs to be accommodated in a ring shape in order to accommodate the client signal path D02.

Figure 10C:
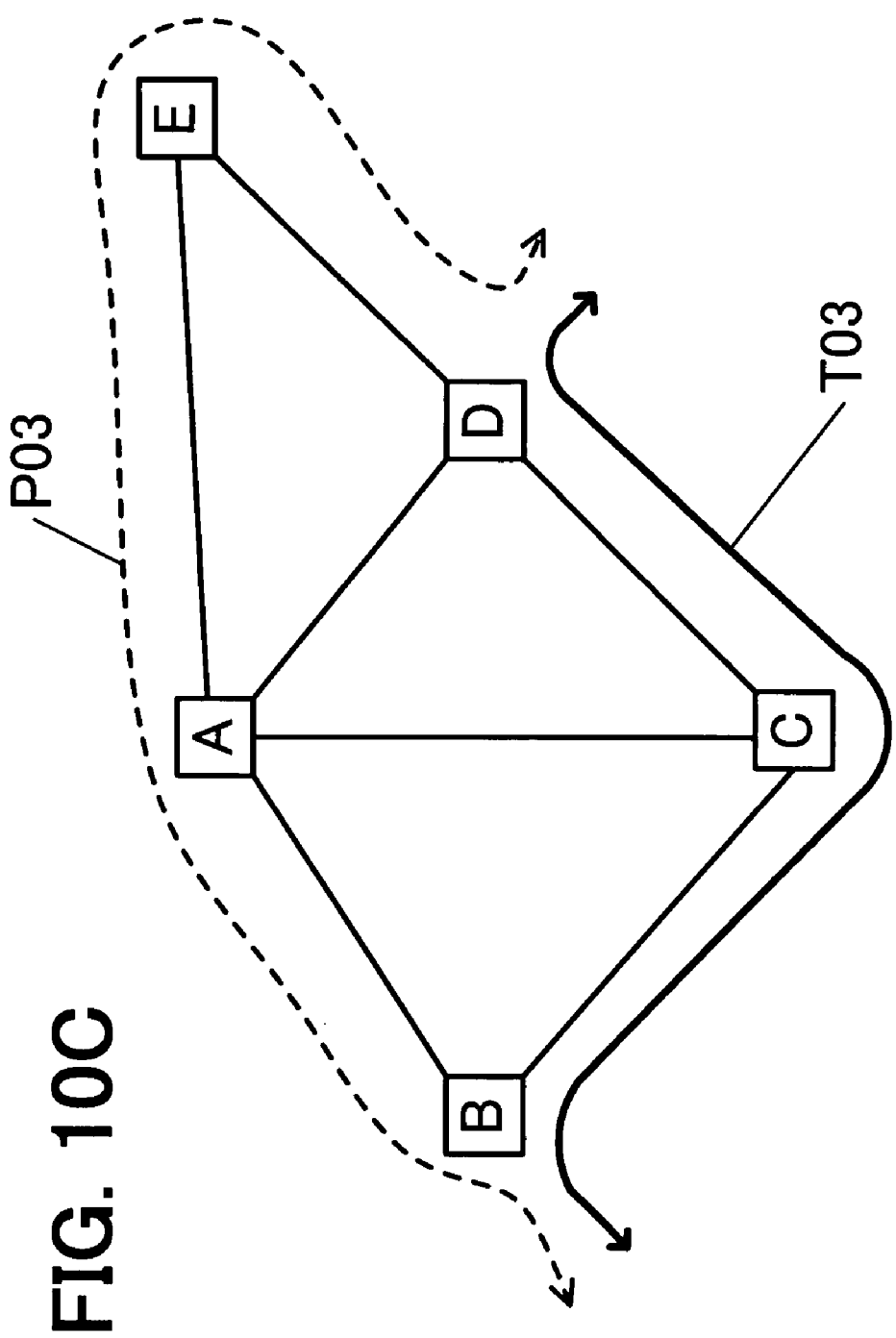

FIG. 10C shows the traffic flow T03 in the normal mode and the traffic flow P03 in the protection mode corresponding to the client signal path D03. The path (OC-48x1) corresponding to the traffic volume of the client signal path D03 needs to be accommodated in a ring shape in order to accommodate the client signal path D03.

Figure 10D:
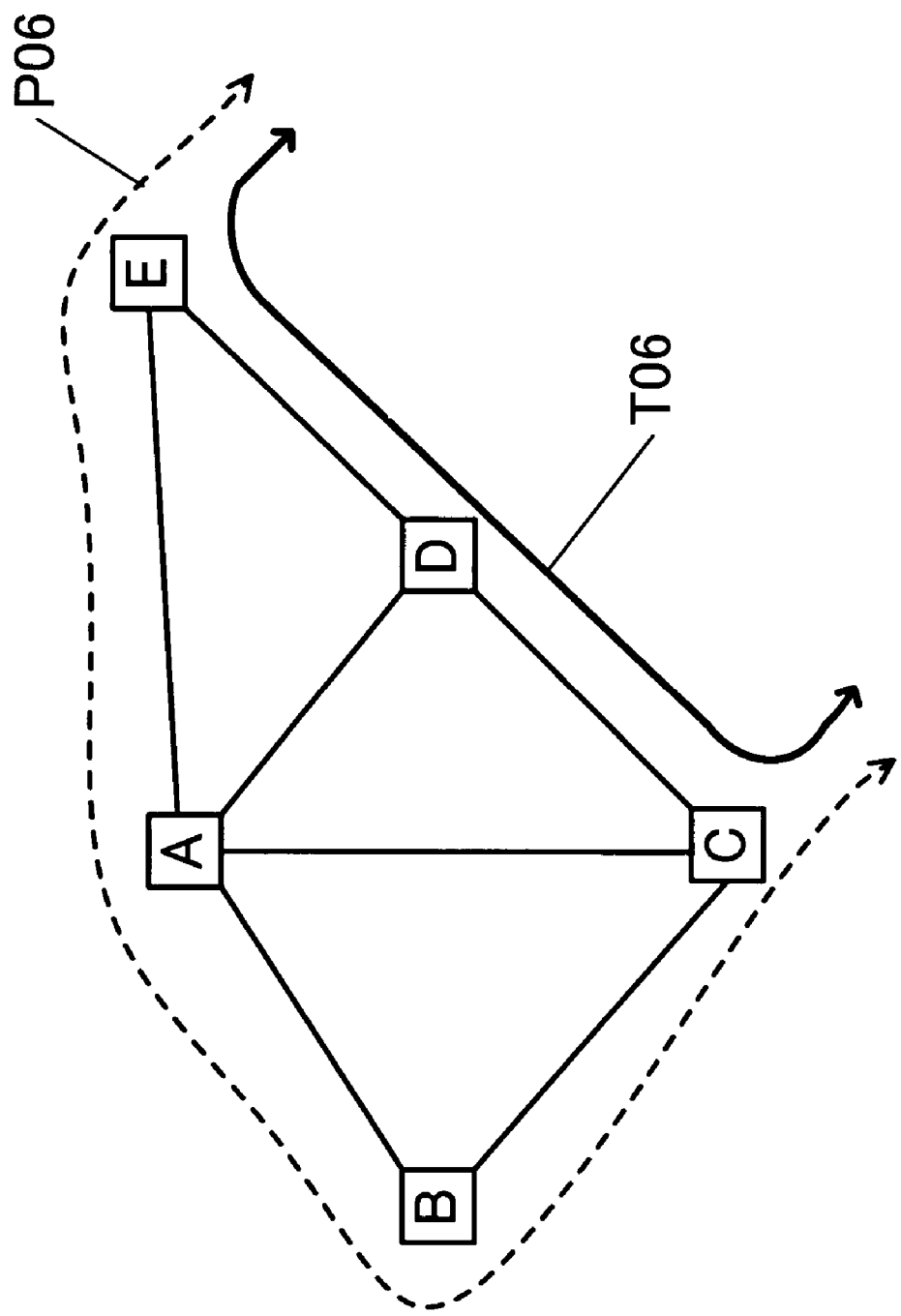

FIG. 10D shows the traffic flow T06 in the normal mode and the traffic flow P06 in the protection mode corresponding to the client signal path D06. The path (OC-48x1) corresponding to the traffic volume of the client signal path D06 needs to be accommodated in a ring shape in order to accommodate the client signal path D06.

However, when all of the client signal paths D01, D02, D03, and D06 are to be accommodated, the total traffic volume corresponds to OC-48x5, which exceeds 10 Gbps. Therefore, all of the client signal paths cannot be accommodated in one wavelength ring of 10 Gbps, but two wavelength rings are required.

In that case, for example, since the total traffic volume of the client signal paths D01, D02, and D03 is OC-48x4 corresponding to OC-192x1, which can be accommodated in one wavelength ring of 10 Gbps, the client signal path D06 is accommodated in another wavelength ring.

Figure 11:
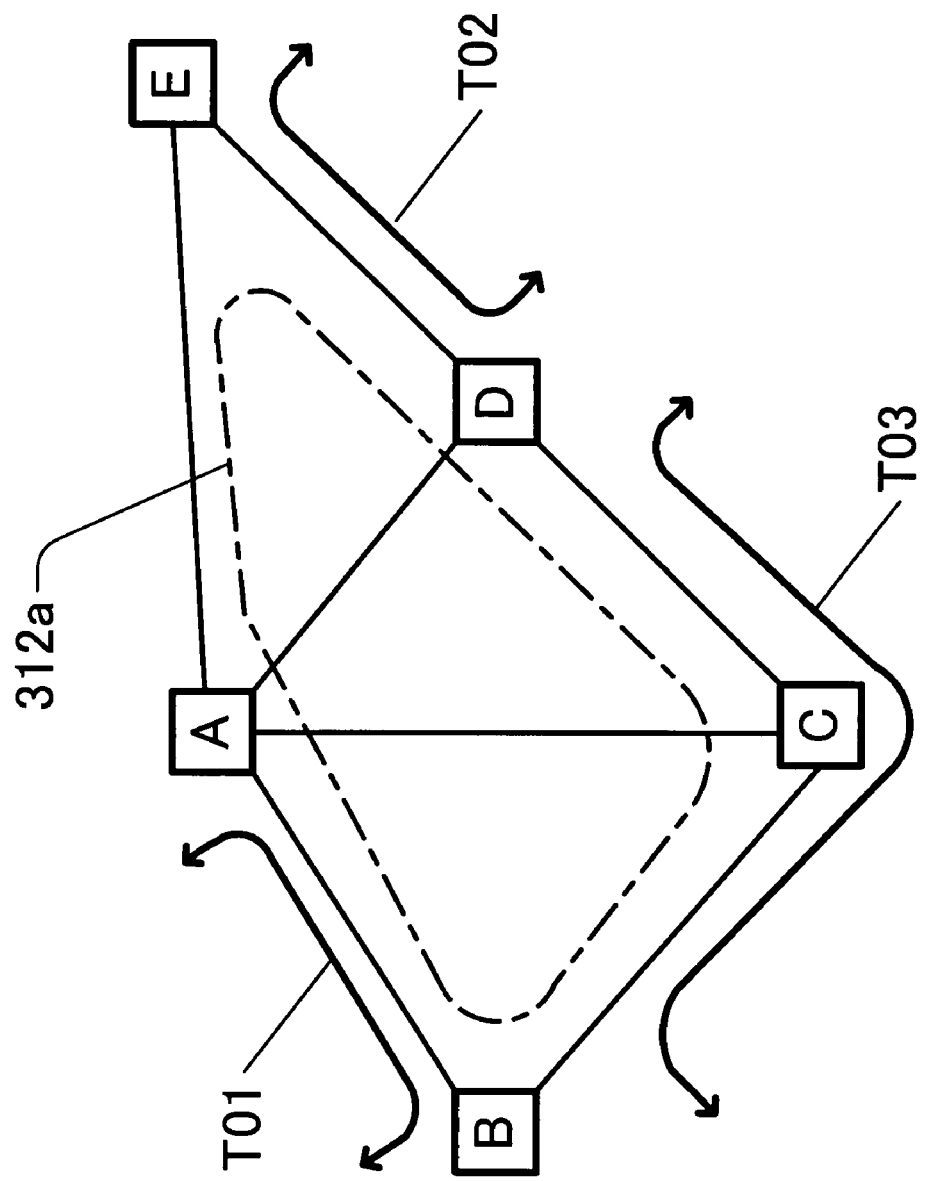
FIG. 11 shows an example of a method for accommodating client signal paths in one wavelength ring.

FIG. 11 shows a method for accommodating the traffic flows of the client signal paths D01, D02, and D03 shown in FIGS. 10A to 10C in one wavelength ring. In this figure, illustration of the traffic flows in the protection mode is omitted.

In this case, a wavelength ring 312a is assigned so as to pass the expanded ring topology 312 obtained in FIG. 8. The end nodes of the client signal path D01 are the nodes A and B, the end nodes of the client signal path D02 are the nodes D and E, and the end nodes of the client signal path D03 are the nodes B and D.

Therefore, the end nodes included in the wavelength ring 312a are the nodes A, B, C, D, and E. Even if a path of a wavelength ring including these end nodes is searched for on the predetermined condition on the basis of the network topology information 10, it is impossible to correct the ring topology to make it smaller, and thus the ring topology 312 selected as an expanded ring topology is determined to be an optimal ring topology. The client signal paths D01, D02, and D03 are accommodated in the wavelength ring 312a passing through the optimal ring topology 312.

As a method for optimally accommodating client signal paths in the ring topology described with reference to the figure (expanded ring topology), the method described in Japanese Patent Application No. 2006-123908 "Method for designing optical network", filed on Apr. 27, 2006, can be applied.

Figure 12A:
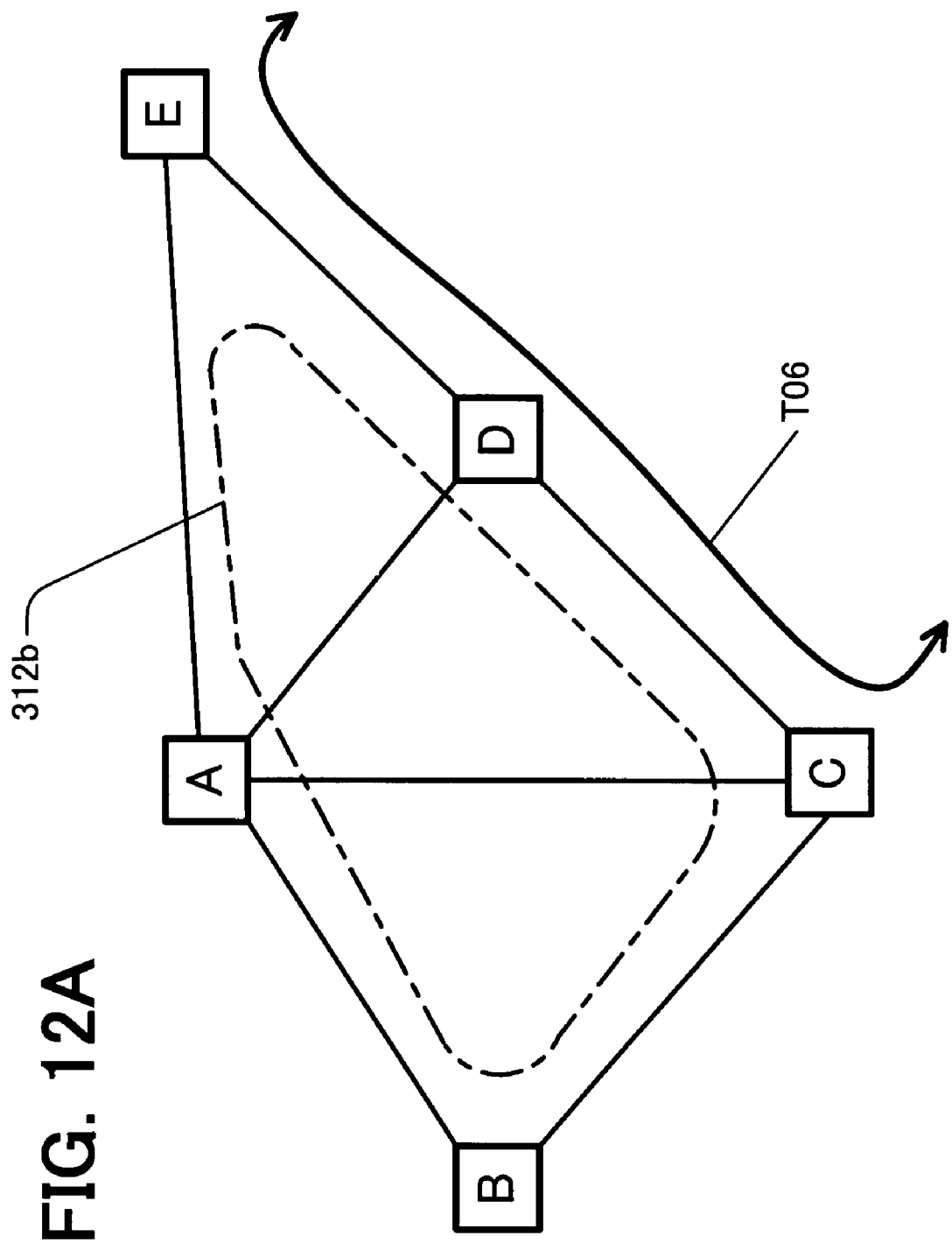
FIGS. 12A and 12B show an example of optimization of a ring topology of a wavelength ring according to the first embodiment of the present invention.
Figure 12B:
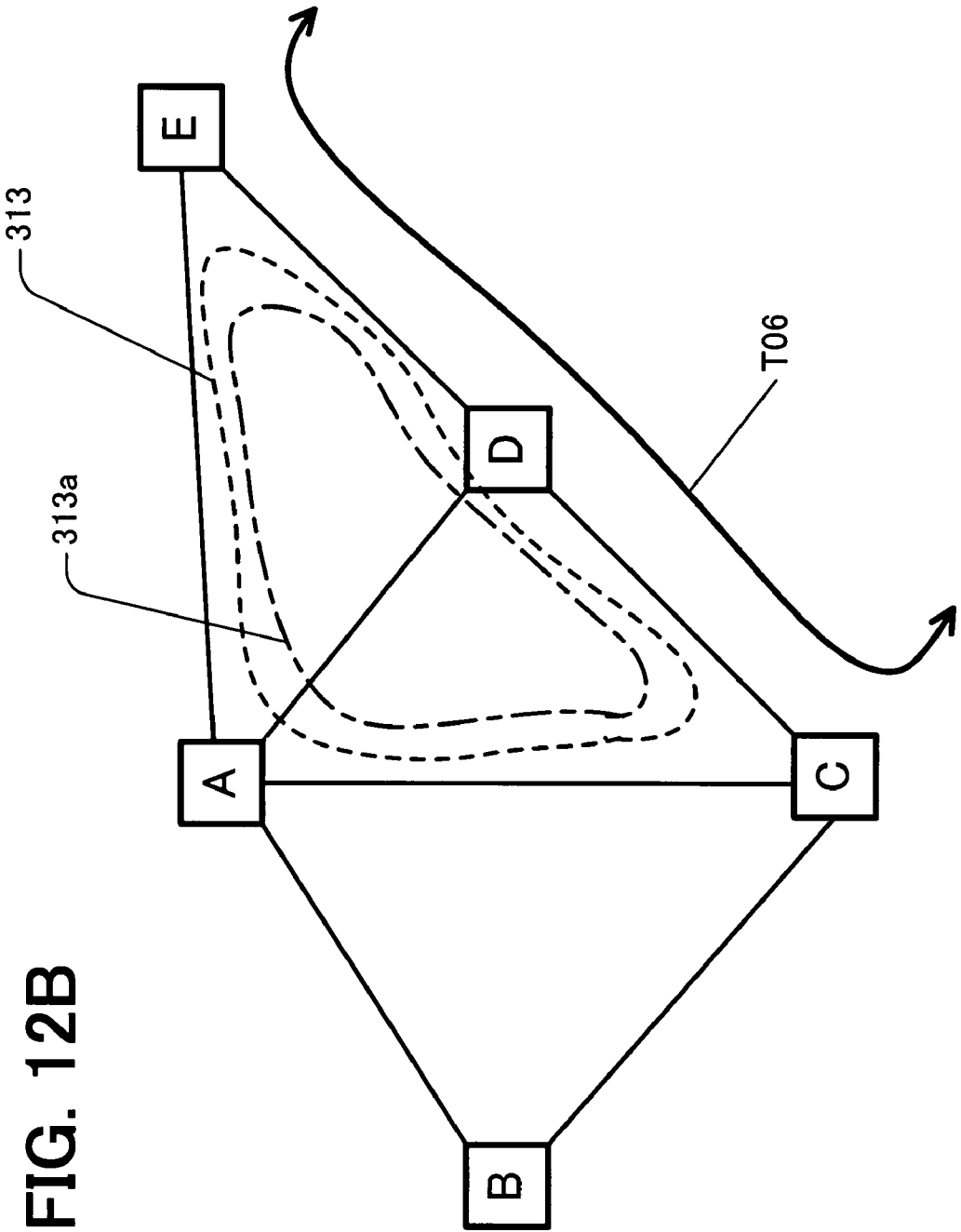

FIGS. 12A and 12B show an example of optimization of a ring topology of a wavelength ring according to the first embodiment of the present invention. This example shows a case where the traffic flow of the client signal path D06 shown in FIG. 10D is accommodated in a wavelength ring.

A wavelength ring 312b shown in FIG. 12A is a wavelength ring to accommodate the traffic flows T06 and P06 shown in FIG. 10D. In this figure, illustration of the traffic P06 in the protection mode is omitted.

The wavelength ring 312b in this stage is a wavelength ring passing through the expanded ring topology 312 shown in FIG. 9.

Herein, the end nodes of the client signal path D06 to be accommodated in the wavelength ring 312b are the nodes C and E. When a ring topology including the nodes C and E is searched for on the predetermined condition on the basis of the network topology information 10, a ring topology 313 that is smaller than the expanded ring topology 312 is found, as shown in FIG. 12B. Then, the path of the wavelength ring 312b is corrected so that the wavelength ring 312b passes through the re-searched ring topology 313, obtaining a wavelength ring 313a. Then, the client signal path D06 is accommodated in the corrected wavelength ring 313a. In FIG. 12B, the ring topology 313 and the wavelength ring 313a are shown in parallel in order to prevent complicated illustration. Actually, however, the wavelength ring 313a passes through the ring topology 313.

As described above, the wavelength ring 312b along the expanded ring topology 312 includes a redundant path A-B-C. On the other hand, the corrected wavelength ring 313a does not include a redundant path, so that an optimal wavelength ring can be assigned considering a transmission characteristic such as a transmission distance.

Figure 13:
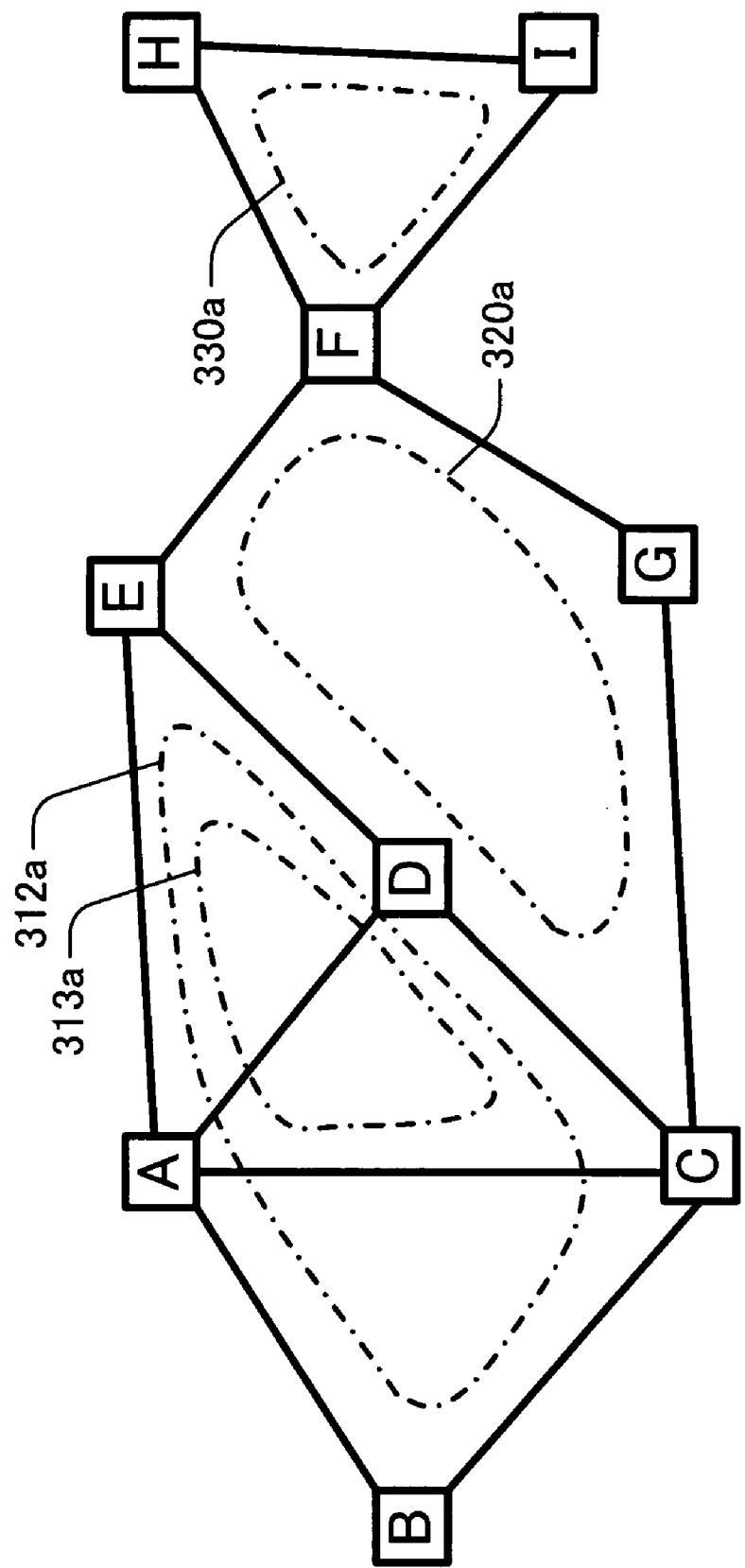
FIG. 13 shows an example of wavelength rings that are eventually assigned in the present invention.

FIG. 13 shows wavelength rings that are eventually assigned in the present invention.

In the network topology shown in FIG. 1, the set of client signal paths shown in the client signal path list 40 shown in FIG. 4 is divided into subsets of client signal paths. The subset of client signal paths including the client signal paths D01, D02, D03, and D06 is accommodated in two wavelength rings: the wavelength rings 312a and 313a, the subset of client signal paths including the client signal path D04 is accommodated in a wavelength ring 320a, and the subset of client signal paths including the client signal path D05 is accommodated in a wavelength ring 330a. Each of the wavelength rings is selected so as to pass through an optimal ring topology satisfying the predetermined condition.

As described above, in the present invention, ring topologies are narrowed down to those adapted to client signal paths on the basis of input client signal path information, and a ring topology satisfying the predetermined condition is selected from among the ring topologies by searching network topology information. Accordingly, the load of searching for a ring topology is reduced and an operation of selecting a wavelength ring appropriate to accommodate client signal paths is automated. As a result, accommodation of client signal paths can be efficiently designed.

In the above-described embodiment, the optical network having the network topology shown in FIG. 1 is described as a representative example for convenience. Also, the present invention can be applied to a network having another arbitrary topology.

In the above-described embodiment, the WDM network is used as a representative example of an optical network and the SONET signal is used as a representative example of a client signal. However, an optical network other than the WDM network and a client signal other than the SONET signal can be applied without affecting the essence of the present invention.

Hereinafter, a second embodiment of the present invention is described with reference to FIGS. 17 to 26 by using the second example of the network topology shown in FIG. 14 as a representative example.

In the second embodiment of the present invention, a predetermined cost is assigned to each communication link between adjoining nodes so that a ring path is searched for more efficiently on the basis of the cost information.

FIG. 17 shows an example of assignment of costs to communication links according to the present invention. In this example, distance information between nodes is assigned as a cost in kilometers to respective communication links between adjoining nodes in the network topology shown in FIG. 14. Herein, the communication links between the adjoining nodes are expressed by "L(node name, node name)". For example, the communication link between adjoining nodes A and B is expressed by "L(A, B)". The sum of the costs between the adjoining nodes passed by the path is defined as a path cost. Then, a ring path is searched for on the basis of the path cost. As the cost information, the distance between nodes, the number of hops, and fiber loss information can be used. The cost information can be held in advance as node accompanying information in the information defining the network topology shown in FIG. 3. When the number of hops is used as the cost information, the number of hops between adjoining nodes may always be 1.

In the second embodiment, a cost is assigned to each communication link of a path included in the network topology in advance to expand a ring topology on the basis of a predetermined path cost condition. Accordingly, the wording of "ring path", which includes the meaning of the "ring topology" described in the first embodiment, is employed in the second embodiment to suggest that a ring path, that is, a ring topology is expanded on the basis of a path cost.

FIG. 18 shows a second example of the configuration of the client signal path information, that is, an example of the configuration of the client signal path information of the present invention for the second example of the network topology shown in FIG. 14. As in FIG. 4, a set of all client signal paths to be accommodated in the optical network (FIG. 14) to be designed is configured as a client signal path list 40a, which can be processed by a computer. Each column in this list is the same as that in FIG. 4.

Figure 19:
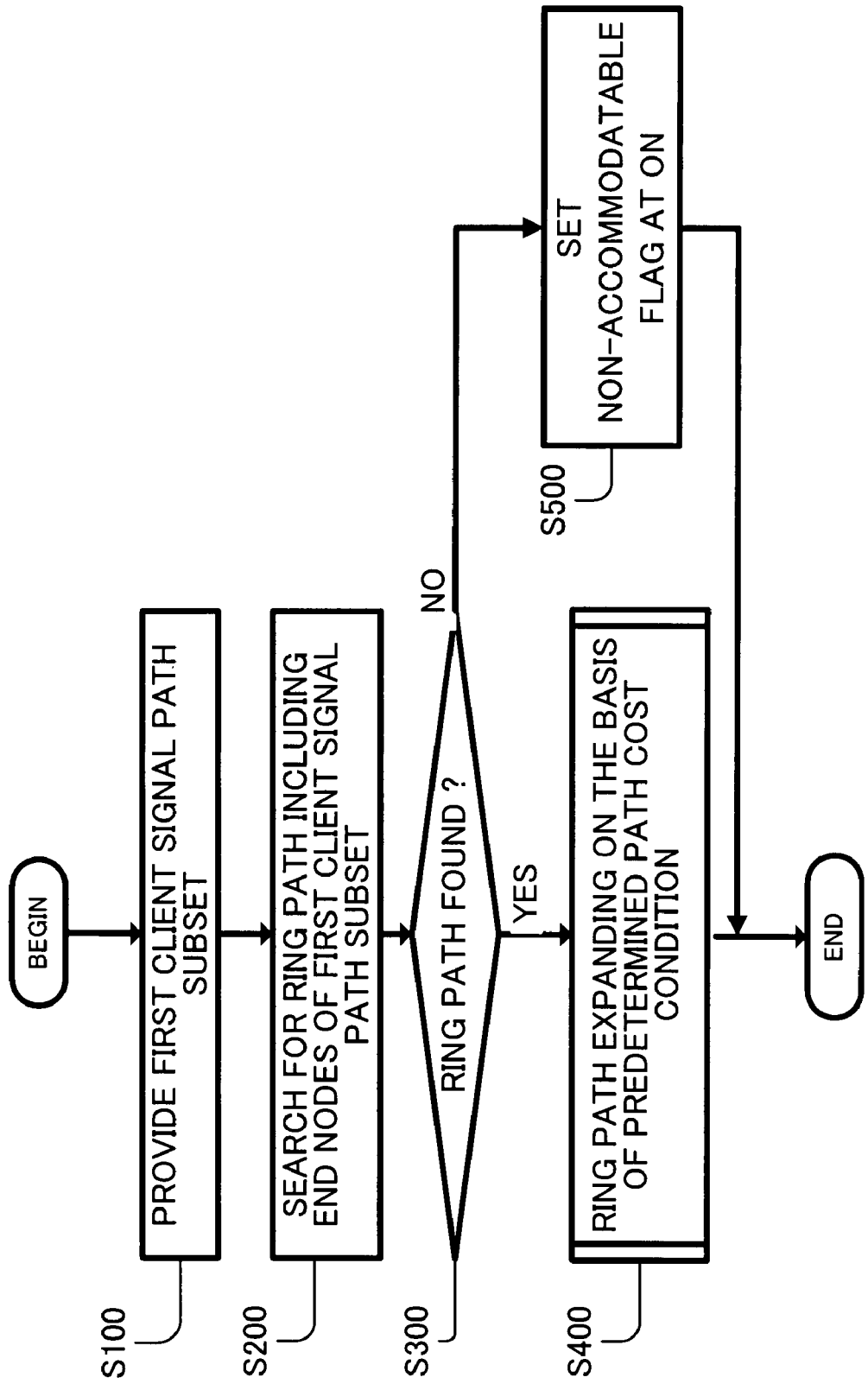
FIG. 19 shows an example of a process of searching for an expanded ring path according to the second embodiment of the present invention.

FIG. 19 shows a process of searching for an expanded ring path according to the second embodiment of the present invention. This process corresponds to the details of step S03 in the process of searching for an expanded ring path shown in FIG. 6 according to the first embodiment of the present invention. In the second embodiment, the procedure of step S03 in FIG. 6 is different, but the other steps are the same as those in FIG. 6.

Now, a process of selecting an expanded ring path satisfying a predetermined path cost condition is described by using the client signal path list 40a shown in FIG. 18 as an example.

S100: First client signal path subset, which is set at calling of this process, is provided by selecting one or more client signal paths from a client signal path set which is a set of client signal paths to be accommodated in the network, and is held. In the example shown in FIG. 18, for example, the client signal path of the largest traffic volume can be selected as the first client signal path subset. That is, D01 is selected from the client signal path list 40a shown in FIG. 18. In another case, for example, the client signal paths sharing the same end node can be selected as the first client signal path subset. That is, D01 and D02 are selected from the client signal path list 40a. Hereinafter, the case where D01 and D02 are selected as a first client signal path subset will be described as a representative example.

S200: A ring path including the end nodes of the one or more client signal paths included in the first client signal path subset provided in step S100 is searched for on a predetermined condition. In the example shown in FIG. 18, a ring path including nodes A, B, and D, which are the end nodes of D01 and D02, is searched for on the predetermined condition.

As the predetermined condition, for example, following three conditions (a), (b), and (c) can be used.

(a) Distance of the ring path calculated with the weight which is given for each communication links between the respective nodes in the optical network is the shortest.

(b) The total number of hops in the ring path is the smallest.

(c) OSNR of the ring path is the largest.

Figure 20:
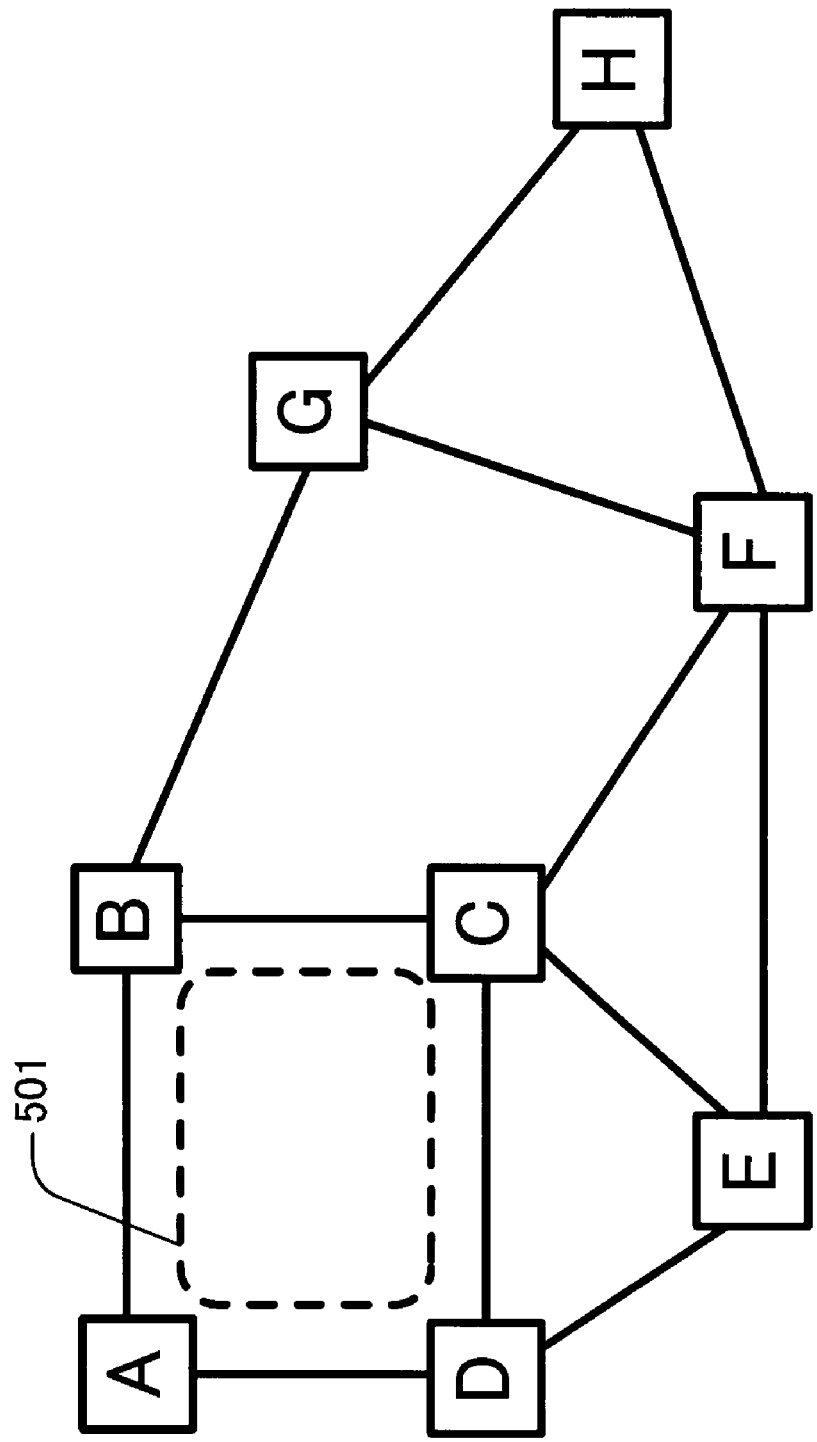
FIG. 20 shows a first example of an expanded ring path according to the second embodiment of the present invention.

In the example shown in FIG. 18 where D01 and D02 are selected as a first client signal path subset, if the shortest distance is the condition of search, the ring path A-B-C-D-A indicated by reference numeral 501 shown in FIG. 20 is found. Then, the processed flags of D1, D2 in the client signal path information shown in FIG. 18 are set to 1.

S300: It is determined whether the ring path satisfying the predetermined condition was found in step S200. If found (YES), the found ring path is regarded as a first ring path and the process proceeds to step S400. If not found (NO), the process proceeds to step S500. In the case of FIG. 18, the ring path is found and thus the process proceeds to step S400.

S400: The first ring path found in step S300 is expanded on the basis of a predetermined path cost condition, the expanded ring path is regarded as a second ring path, and the process ends. The details of this step are described below with reference to FIGS. 21, 23, and 26.

S500: Since the one or more client signal paths included in the first client signal path subset provided in step S100 are non-accommodatable, and thus the non-accommodatable flags in the corresponding entries in FIG. 18 are set to ON (for example, set to 1). Then, the process ends.

Figure 21:
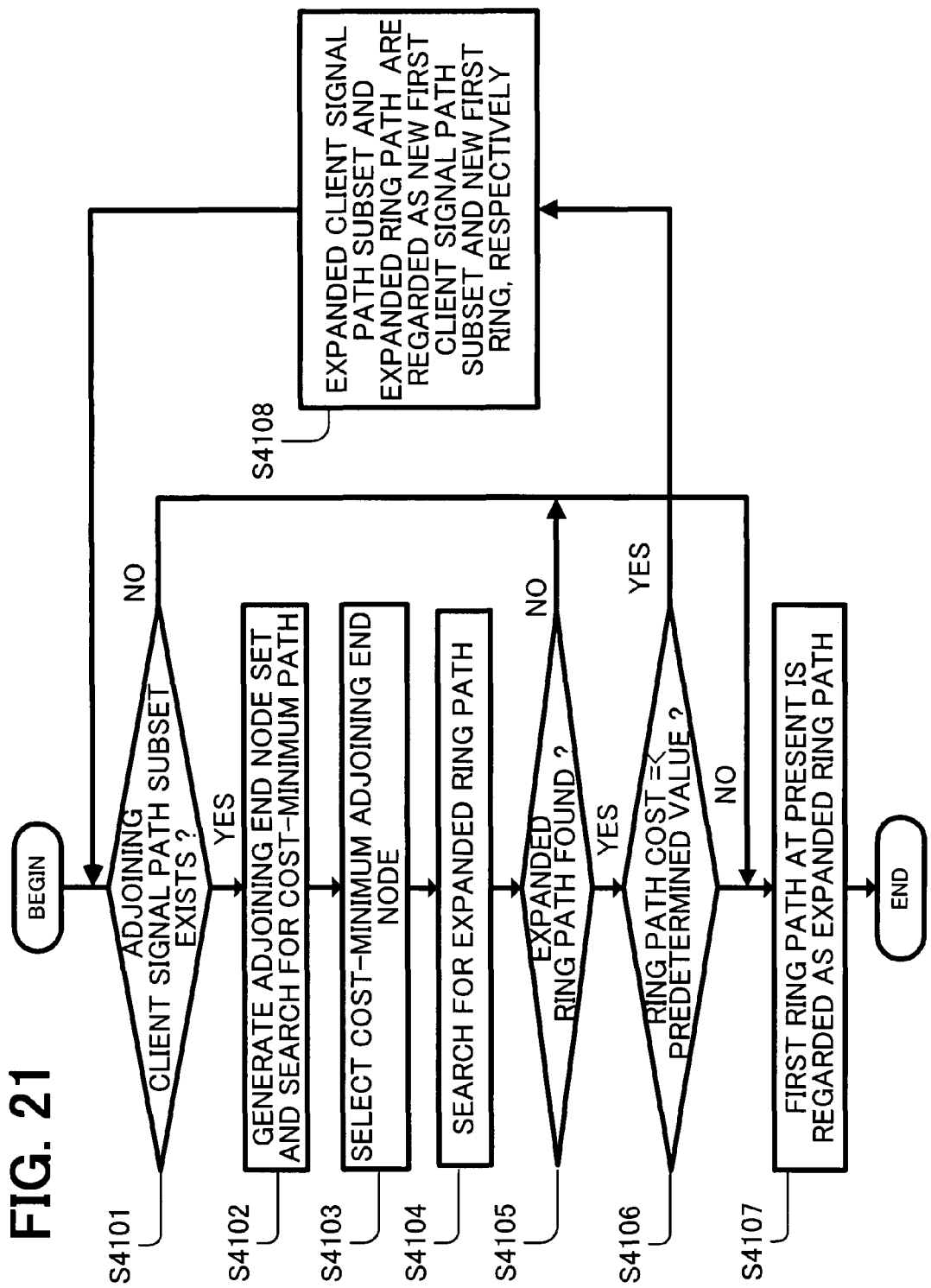
FIG. 21 shows a first example of a process of expanding a ring on the basis of a path cost condition according to the second embodiment of the present invention.

FIG. 21 shows a first example of a process of expanding a ring path on the basis of a path cost condition according to the second embodiment of the present invention.

S4101: It is determined whether an adjoining client signal path subset exists.

That is, it is determined whether there is a client signal path one of the end nodes thereof included in the first ring path (a first end node) and the other end node not included in the first ring path (a second end node). If such a client signal path exists (YES), the process proceeds to step S4102. If not exist (NO), the process skips to step S4107.

In the example shown in FIG. 18, client signal paths D03, D04, and D05 satisfy the condition with respect to the first ring path (A-B-C-D-A), and thus the process proceeds to step S4102.

S4102: One or more client signal paths one of the end nodes thereof included in the first ring path (a first end node) and the other end node not included in the first ring path (a second end node) are collected, and those client signal paths are regarded as an adjoining client signal path subset. Then, in the client signal paths included in the adjoining client signal path subset, the end nodes not included in the first ring path (second end nodes) are collected so as to generate an adjoining end node set. In the example shown in FIG. 18, the end nodes of D03 are nodes B and H. End node B is included in the first ring path, whereas end node H is not included in the first ring path. Thus, end node H is put in the adjoining end node set as an adjoining end node. Likewise, end node F of D04 and end node E of D05 are put in the adjoining end node set. As a result, end nodes H, F, and E are included in the adjoining end node set.

Then, for each adjoining end node in the adjoining end node set, the path of the minimum path cost to the node on the first ring path is searched for. The path of the minimum path cost (a cost-minimum path) can be searched for by using Dijkstra algorithm or the like. In the example shown in FIGS. 17 and 18, distance is used as the path cost. The shortest path from node H to each node on the first ring path is obtained as follows. The path from node H to node A is H-G-B-A, which is 170 km. The path from node H to node B is H-G-B, which is 140 km. The path from node H to node C is H-F-C, which is 110 km. The path from node H to node D is H-F-C-D, which is 140 km. The shortest path among them is the path from node H to node C. Therefore, the path of the minimum cost from node H to the first ring path is H-F-C, and the path cost (distance) thereof is 110 km.

The same process is performed on node F. In this case, the cost-minimum path is F-C, and the path cost (distance) thereof is 50 km. Also, the same process is performed on node E. In this case, the cost-minimum path is E-D, and the path cost (distance) thereof is 30 km. In node E, the path E-C is also 30 km. Any of the paths E-C and E-D can be selected, but the path E-D is selected in this case.

S4103: The minimum path costs from the respective adjoining end nodes in the adjoining end node set to the first ring path obtained in step S4102 are compared with each other, and the cost-minimum adjoining end node, that is, the adjoining end node of the minimum path cost is selected from the adjoining end node set. In the example shown in FIG. 18, node E is selected as the cost-minimum adjoining end node.

S4104: An expanded ring path including the cost-minimum adjoining end node selected in step S4103 (e.g. node E) and all end nodes of the client signal paths in the first client signal path subset (e.g., nodes A, B, and D) is searched for. In the example shown in FIG. 18, ring path 502 shown in FIG. 22 is searched for as the expanded ring path.

S4105: It is determined whether the expanded ring path was found in step S4104. If found (YES), the expanded ring path is regarded as a second ring path and the process proceeds to step S4106. If not found (NO), the process skips to step S4107.

Figure 22:
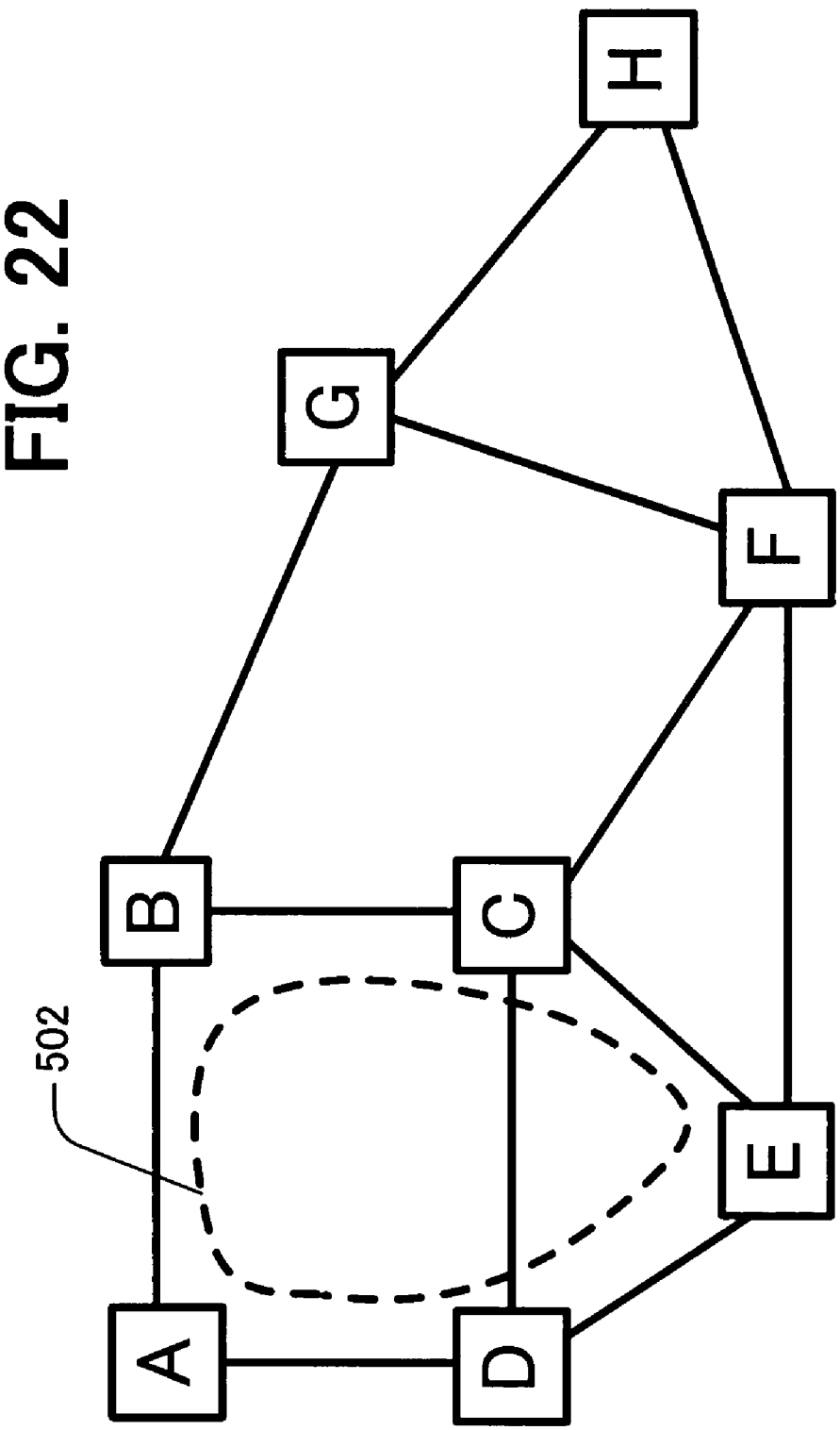
FIG. 22 shows a second example of the expanded ring path according to the second embodiment of the present invention.

In the example shown in FIG. 18, ring path 502 shown in FIG. 22 is found as the expanded ring path. Accordingly, the determination result is YES, and the process proceeds to step S4106.

S4106: The path cost of the entire expanded ring path searched for in step S4104, that is, the ring path cost is calculated, and it is determined whether the ring path cost is equal to or smaller than a predetermined value. If the ring path cost is equal to or smaller than the predetermined value (YES), the process proceeds to step S4108. Otherwise (NO), the process proceeds to step S4107. In the example shown in FIG. 18, the ring path cost (distance) of the entire second ring path obtained in step S4105 is 150 km. Whether this distance is equal to or smaller than the predetermined value is determined.

S4107: The process ends while the first ring path at present is regarded as the eventual expanded ring path. In this process, even if the ring path is not expanded at all, the process ends while the original ring path is regarded as the expanded ring path. In that case, by adding logic to determine whether the process is the first loop process in steps S4101 and S4105, a process of notification can be added.

S4108: The client signal path having, as an end node, the cost-minimum adjoining end node selected in step S4103 from the adjoining end node set is added to the first client signal path subset to generate a second client signal path subset which is then regarded as a new first client signal path subset.

In another aspect of the second embodiment of the present invention, one or more client signal paths which have end nodes both included in the first ring path and the client signal path having, as an end node, the cost-minimum adjoining end node selected in step S4103 from the adjoining end node set are added to the first client signal path subset to generate a second client signal path subset which is then regarded as a new first client signal path subset.

Meanwhile, the second ring path obtained in step S4105 is regarded as a new first ring path. Then, the process returns to step S4101.

With the above-described process, the ring path can be expanded step by step so that the ring path cost, that is, the path cost of the entire ring path, does not exceed the predetermined value.

Figure 23:
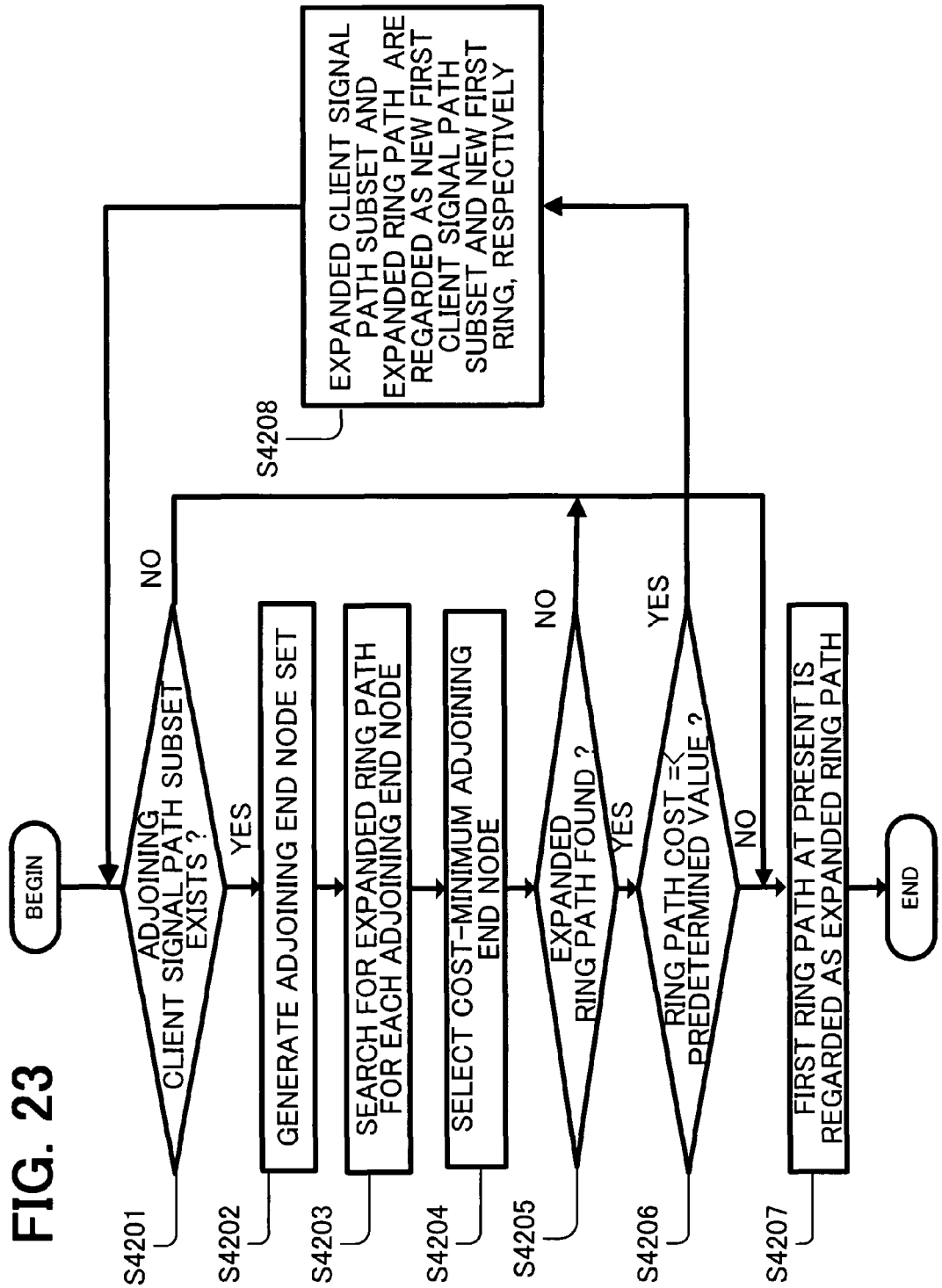
FIG. 23 shows a second example of the process of searching for an expanded ring according to the second embodiment of the present invention.
Figure 24:
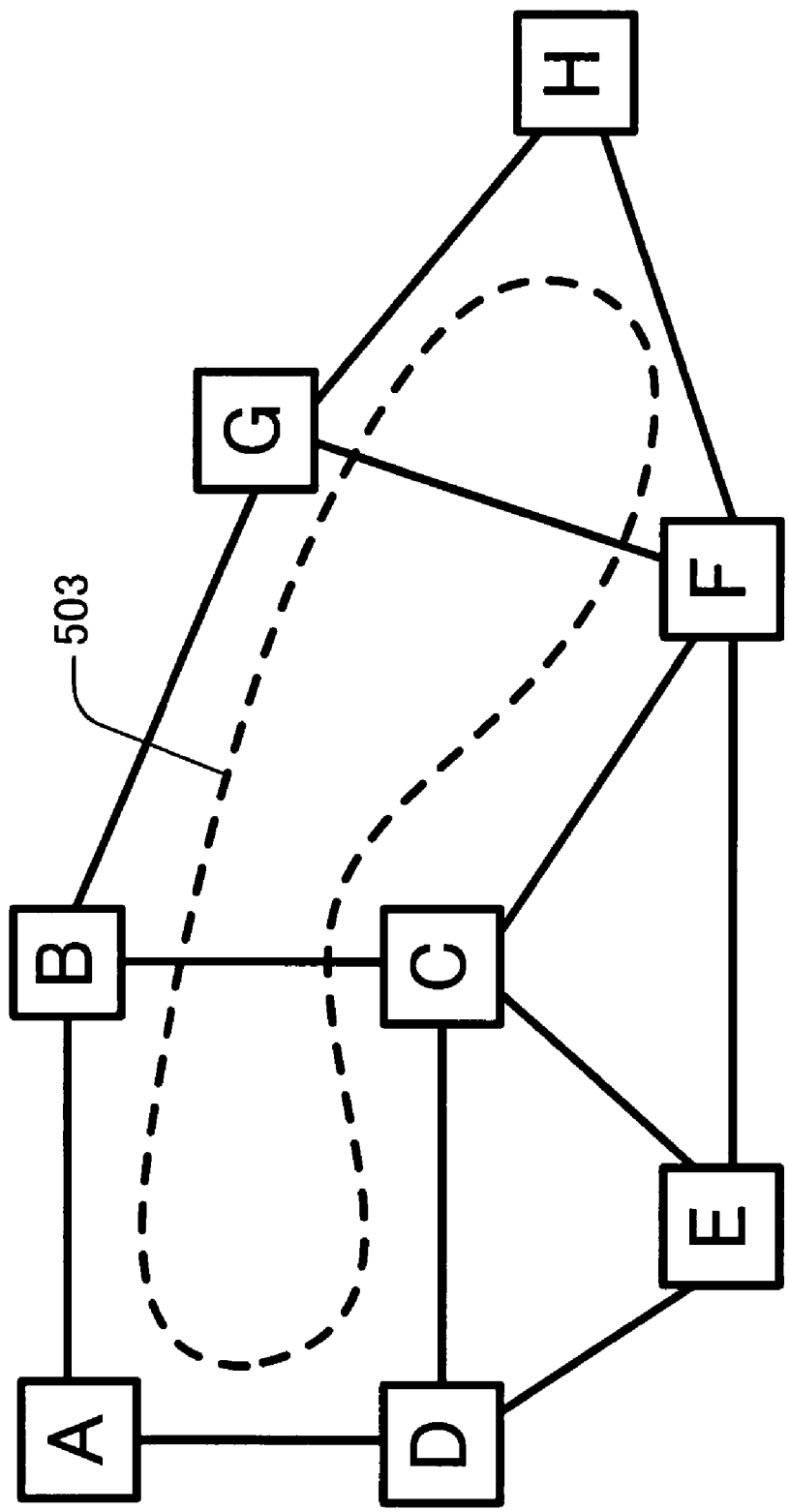
FIG. 24 shows a third example of the expanded ring path according to the second embodiment of the present invention.
Figure 25:
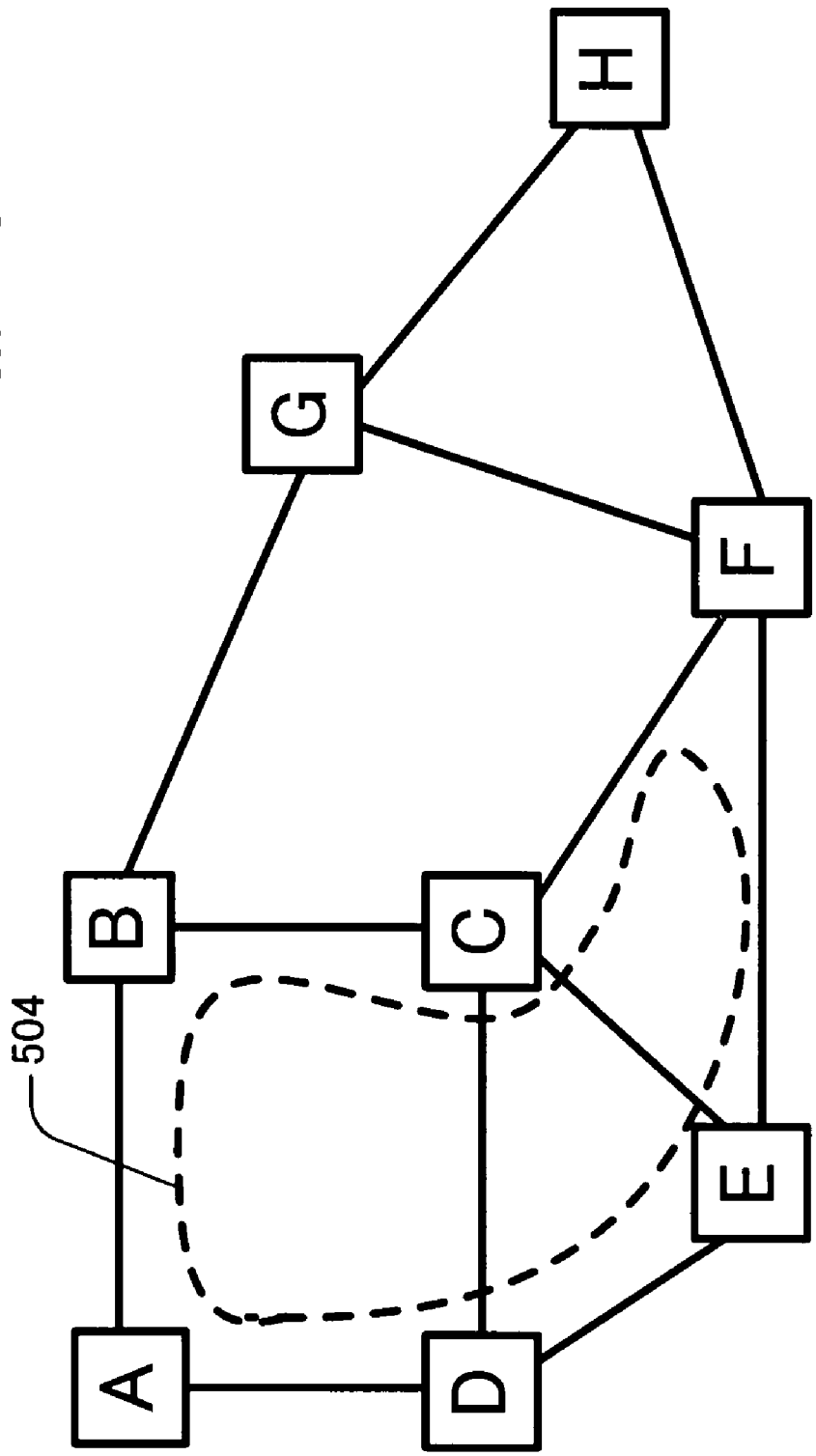
FIG. 25 shows a fourth example of the expanded ring path according to the second embodiment of the present invention.

FIG. 23 shows a second example of the process of expanding a ring path on the basis of a path cost condition according to the second embodiment of the present invention.

S4201: It is determined whether an adjoining client signal path subset exists.

That is, it is determined whether there is a client signal path one of the end nodes thereof included in the first ring path (a first end node) and the other end node not included in the first ring path (a second end node). If such a client signal path exists (YES), the process proceeds to step S4202. If not exist (NO), the process proceeds to step S4207.

In the example shown in FIG. 18, client signal paths D03, D04, and D05 satisfy the condition with respect to the first ring path (A-B-C-D-A), and thus the process proceeds to step S4202.

S4202: Client signal paths one of the end nodes thereof included in the first ring path (a first end node) and the other end node not included in the first ring path (a second end node) are collected, and those client signal paths are regarded as an adjoining client signal path subset. Then, in the client signal paths included in the adjoining client signal path subset, the end nodes not included in the first ring path (second end nodes) are collected so as to generate an adjoining end node set.

In the example shown in FIG. 18, the end nodes of D03 are nodes B and H. End node B is included in the first ring path, whereas end node H is not included in the first ring path. Thus, end node H is put in the adjoining end node set as an adjoining end node. Likewise, end node F of D04 and end node E of D05 are put in the adjoining end node set. As a result, end nodes H, F, and E are included in the adjoining end node sets.

S4203: For each end node in the adjoining end node set generated in step S4202, an expanded ring path including the end node and all end nodes of the client signal paths included in the first client signal path subset is searched for on a predetermined condition. Accordingly, the maximum number of expanded ring paths that are searched for is the same as the number of the end nodes included in the adjoining end node set.

For example, assume that ring path 501 shown in FIG. 20 is regarded as the first ring path. The adjoining end node set includes nodes H, F, and E, and the all end nodes of the client signal paths included in the first client signal path subset (D01 and D02 shown in FIG. 18) are nodes A, B, and D. Thus, an expanded ring path including nodes H, A, B, and D; an expanded ring path including nodes F, A, B, and D; and an expanded ring path including nodes E, A, B, and D are searched for. The search results are ring path 503 shown in FIG. 24, ring path 504 shown in FIG. 25, and ring path 502 shown in FIG. 22, respectively.

S4204: Among the expanded ring paths searched for in step S4203, the ring path of the minimum ring path cost is selected. For example, when distance is used as a path cost, the ring path having the shortest distance is selected. And the adjoining end node included in the selected ring path is selected as a cost-minimum adjoining end node.

For example, in the network topology shown in FIG. 14, the distance of the entire expanded ring path including nodes H, A, B, and D is 340 km, the distance of the entire expanded ring path including nodes F, A, B, and D is 270 km, and the distance of the entire expanded ring path including nodes E, A, B, and D is 150 km. Accordingly, the expanded ring path including nodes E, A, B, and D is selected as the ring path of the minimum ring path cost and node E is selected as a cost-minimum adjoining end node.

S4205: It is determined whether the ring path of the minimum ring path cost was selected in step S4204. If selected (YES), the selected ring path is regarded as a second ring path and the process proceeds to step S4206. If not selected (NO), the process skips to step S4207.

In the example shown in FIG. 18, ring path 502 shown in FIG. 22 is selected as the expanded ring path of the minimum ring path cost, the determination result is YES, and the process proceeds to step S4206.

S4206: It is determined whether the path cost of the second ring path (the expanded ring path) obtained in step S4205 is equal to or smaller than a predetermined value. If the path cost is equal to or smaller than the predetermined value (YES), the process proceeds to step S4208. Otherwise (NO), the process proceeds to step S4207. In the example shown in FIG. 18, the ring path cost of the second ring path obtained in step S4205 is 150 km. Whether this distance is equal to or smaller than the predetermined value is determined.

S4207: The process ends while the first ring path at present is regarded as the eventual expanded ring path.

S4208: The client signal path having, as an end node, the cost-minimum adjoining end node selected in step S4204 from the adjoining end node set is added to the first client signal path subset to generate a second client signal path subset which is then regarded as a new first client signal path subset.

In another aspect of the second embodiment of the present invention, one or more client signal paths which have end nodes both included in the first ring path and the client signal path having, as an end node, the cost-minimum adjoining end node selected in step S4204 from the adjoining end node set are added to the first client signal path subset to generate a second client signal path subset which is then regarded as a new first client signal path subset.

Meanwhile, the second ring path obtained in step S4205 is regarded as a new first ring path. Then, the process returns to step S4201.

With the above-described process, the ring path can be expanded step by step while minimizing an increase in the path cost caused by expansion of the ring path.

FIG. 26 shows a third example of the process of expanding a ring on the basis of a path cost condition according to the second embodiment of the present invention.

S4301: It is determined whether a adjoining client signal path subset exists.

That is, it is determined whether there is a client signal path one of the end nodes thereof included in the first ring path (a first end node) and the other end node not included in the first ring path (a second end node). If such a client signal path exists (YES), the process proceeds to step S4302. If not exist (NO), the process proceeds to step S4309.

S4302: In the client signal paths included in the adjoining client signal path subset, the end nodes not included in the first ring path (the second end nodes) are collected so as to generate an adjoining end node set. In the example shown in FIG. 18, the end nodes of D03 are nodes B and H. End node B is included in the first ring path, whereas end node H is not included in the first ring path. Thus, end node H is put in the adjoining end node set as an adjoining end node. Likewise, end node F of D04 and end node E of D05 are put in the adjoining end node set. As a result, adjoining end nodes H, F, and E are included in the adjoining end node set.

Then, the cost-minimum path, that is, the path of the minimum cost from each adjoining end node of the adjoining end node set to the first ring path is searched for, and the path cost thereof is calculated.

S4303: The respective adjoining end nodes in the adjoining end node set are sorted in ascending order of the path cost of the cost-minimum path obtained in S4302.

S4304: From among the sorted adjoining end nodes, the adjoining end node having the minimum path cost to the first ring path is selected.

S4305: An expanded ring path which includes the adjoining end node selected in step S4304 and the first ring path, is searched for on a predetermined condition.

S4306: It is determined whether the expanded ring path was found in step S4305. If found (YES), the expanded ring path found is regarded as a second ring path and the process proceeds to step S4310. If not found (NO), the process proceeds to step S4307.

S4307: The adjoining end node selected in step S4304 is deleted from the adjoining end node set.

S4308: It is determined whether the adjoining end node set is empty. If empty (YES), the process proceeds to step S4309. If not empty (NO), the process returns to step S4304. Note that, in step S4304 at this time, the adjoining end node of the minimum path cost at the time when the adjoining end node set is generated is deleted in step S4307. Thus, the adjoining end node of the second lowest path cost is selected. In this way, the adjoining end nodes in the adjoining end node set are examined in ascending order of the path cost, and the process of searching for an expanded ring path is repeated until the expanded ring path is found or the adjoining end node set becomes empty.

S4309: The process ends while the first ring path at present is regarded as the eventual expanded ring path.

S4310: It is determined whether the path cost of the expanded ring path is equal to or smaller than a predetermined value. If the path cost of the expanded ring path is equal to or smaller than the predetermined value (YES), the process proceeds to step S4311. If the path cost of the expanded ring path exceeds the predetermined value (NO), the process proceeds to step S4309.

S4311: The client signal path having, as an end node, the cost-minimum adjoining end node selected in step S4304 from the adjoining end node set is added to the first client signal path subset to generate a second client signal path subset which is then regarded as a new first client signal path subset.

In another aspect of the second embodiment of the present invention, one or more client signal paths which have end nodes both included in the first ring path and the client signal path having, as an end node, the cost-minimum adjoining end node selected in step S4304 from the adjoining end node set are added to the first client signal path subset to generate a second client signal path subset which is then regarded as a new first client signal path subset.

Meanwhile, the second ring path obtained in step S4306 is regarded as a new first ring path. Then, the process returns to step S4301.

With the above-described process, in the first example of the process of expanding a ring on the basis of the path cost condition shown in FIG. 21, even if an expanded ring path including the adjoining end node having the minimum path cost from the adjoining end nodes to the first ring path is not found, the adjoining end node of the second lowest path cost from the adjoining end node set to the first ring path can be sequentially selected so as to expand the ring path. Accordingly, the ring path can be expanded more efficiently.

What is claimed is:

1. A method for designing accommodation of client signal paths in an optical network by using a computer system including a network topology information storing part and a client signal path information storing part, comprising:
    providing, by the computer system, the network topology information storing part with network topology information defining a connection relationship between nodes of the optical network;
    providing, by the computer system, the client signal path information storing part with client signal path information for each client signal path, the client signal path information including end node identification information and path bandwidth information, the end node identification information identifying a pair of end nodes comprising a transmitting end node and a receiving end node of the client signal path, the path bandwidth information indicating a bandwidth of the client signal path between the pair of end nodes;
    a first path subset selecting step of selecting, by the computer system, a first path subset of a total path set of client signal paths to be accommodated in the optical network;
    a first ring selecting step of selecting, by the computer system, a first ring topology including end nodes of all client signal paths included in the first path subset;
    a first path expanding step of expanding, by the computer system, the first path subset into a second path subset of the total path set by adding to the first path subset an additional client signal path that is not included in the first path subset and that has at least one node of the first ring topology as an end node thereof; and
    a first ring expanding step of searching, by the computer system, the network topology information for a second ring topology on a predetermined condition, the second ring topology including all nodes of the first ring topology and a pair of end nodes of the additional client signal path.

2. The method of claim 1, further comprising:
    a second path subset selecting step of selecting, by the computer system, the second path subset as a first path subset;
    a second ring selecting step of selecting, by the computer system, the second ring topology as a first ring topology;
    a second path expanding step of expanding, by the computer system, the first path subset into a second path subset by performing the first path expanding step on the first path subset selected by the second path subset selecting step;
    a second ring expanding step of expanding, by the computer system, the first ring topology into the second ring topology by performing the first ring expanding step on the first ring topology selected by the second ring selecting step; and
    an expansion repeating step of repeating, by the computer system, the second path subset selecting step, the second ring selecting step, the second path expanding step, and the second ring expanding step, until the first path subset cannot be expanded any more or until the first ring topology cannot be expanded any more.

3. The method of claim 2, wherein
the second path subset selecting step selects, as a first path subset, an initial client signal path from the total path set of client signal paths;
the second ring selecting step selects, as the first ring topology, a ring topology including a pair of end nodes of the selected initial client signal path; and
the second path subset and the second ring topology finally obtained by the expansion repeating step are determined to be an expanded path subset and an expanded ring topology of the selected initial client signal path, respectively.

4. The method of claim 3, further comprising:
assigning, by the computer system, to the expanded ring topology one or more wavelength rings each having a predetermined wavelength and bandwidth; and
accommodating, by the computer system, each of one or more client signal paths included in the expanded path subset by one of the one or more wavelength rings.

5. The method of claim 4, further comprising:
searching, by the computer system, the network topology information, on the predetermined condition, for a corrected ring topology corresponding to each of the one or more wavelength rings, the corrected ring topology including end nodes of one or more client signal paths accommodated by each of the one or more wavelength rings; and
correcting each of the one or more wavelength rings to a corrected wavelength ring having the corrected ring topology.

6. The method of claim 3, further comprising:
notifying, by the computer system, that the selected client signal path cannot be accommodated when the first ring topology cannot be expanded any more by the expansion repeating step.

7. The method of claim 3, further comprising:
a total path set redefining step of redefining, by the computer system, a set of client signal paths obtained by removing the expanded path subset of the selected client signal path from the total path set of client signal paths, as a total path set of client signal paths;
a total path set expansion step of obtaining, by the computer system, the expanded path subset and the expanded ring topology with respect to the total path set of client signal paths redefined by the total path set redefining step; and
a total path set expansion repeating step of repeating, by the computer system, the total path set redefining step and the total path set expansion step until a total path set of client signal paths cannot be redefined any more by the total path set redefining step.

8. The method of claim 1, wherein the first ring expanding step is performed by searching the network topology information on the predetermined condition of minimizing a weighted path length of the second ring topology on the basis of weighted distance information included in the network topology information.

9. The method of claim 1, wherein the first ring expanding step is performed by searching the network topology information on the predetermined condition of minimizing a hop count of the second ring topology on the basis of hop count information included in the network topology information.

10. The method of claim 1, wherein the first ring expanding step is performed by searching the network topology information on the predetermined condition of maximizing an OSNR value of the second ring topology on the basis of OSNR information included in the network topology information.

11. A non-transitory computer readable medium storing instructions for allowing a computer system to execute a method for designing accommodation of client signal paths to an optical network, the method comprising:
providing network topology information defining a connection relationship between nodes of the optical network;
providing client signal path information for each client signal path, the client signal path information including end node identification information and path bandwidth information, the end node identification information identifying a pair of end nodes comprising a transmission end and a reception end of the client signal path, the path bandwidth information indicating a bandwidth of the client signal path between the pair of end nodes;
a first path subset selecting step of selecting a first path subset of a total path set of client signal paths to be accommodated in the optical network;
a first ring selecting step of selecting a first ring topology including end nodes of all client signal paths included in the first path subset;
a first path expanding step of expanding the first path subset into a second path subset of the total path set by adding to the first path subset additional client signal path that is not included in the first path subset and that has at least one node of the first ring topology as an end node; and
a first ring expanding step of searching the network topology information for a second ring topology on a predetermined condition, the second ring topology including all nodes of the first ring topology and the end nodes of the additional client signal path.

12. The non-transitory computer readable medium of claim 11, the method further comprising:
a second path subset selecting step of selecting the second path subset as a first path subset;
a second ring selecting step of selecting the second ring topology as a first ring topology;
a second path expanding step of expanding the first path subset into a second path subset by performing the first path expanding step on the first path subset selected by the second path subset selecting step;
a second ring expanding step of expanding the first ring topology into the second ring topology by performing the first ring expanding step on the first ring topology selected by the second ring selecting step; and
an expansion repeating step of repeating the second path expanding step and the second ring expanding step until a second path subset cannot be selected any more or until the second ring topology cannot be selected any more.

13. A method for designing accommodation of client signal paths in a network by using a computer system including a network topology information storing part and a client signal path information storing part, comprising:
providing, by the computer system, the network topology information storing part with network topology information defining a communication link between nodes of the network with a cost assigned to the communication link;
providing, by the computer system, the client signal path information storing part with client signal path information for each client signal path included in a client signal path set of client signal paths to be accommodated in the network, the client signal path information including end node identification information and path bandwidth information, the end node identification information identifying a pair of end nodes comprising a transmitting end node and a receiving end node of the client signal path, the path bandwidth information indicating a bandwidth of the client signal path between the pair of end nodes;

a first client signal path subset providing step of providing, by the computer system, a first client signal path subset which is a subset of the client signal path set;

a first ring path providing step of providing, by the computer system, a first ring path which is a ring path including end nodes of all client signal paths included in the first client signal path subset;

an adjoining client signal path subset generating step of selecting, by the computer system, from among one or more client signal paths that are included in the client signal path set and that are not included in the first client signal path subset, a client signal path having a first end node included in the first ring path and a second end node not included in the first ring path, so as to generate an adjoining client signal path subset which is a set of the one or more client signal paths selected;

an adjoining end node set generating step of selecting, by the computer system, the second end node from among end nodes of one or more client signal paths in the adjoining client signal path subset, so as to generate an adjoining end node set which is a set of the one or more second end nodes selected;

a cost-optimum adjoining end node selecting step of selecting, by the computer system, from the adjoining end node set, a cost-optimum adjoining end node which is an end node satisfying a predetermined path cost condition, wherein a path cost of a path is calculated as the sum of one or more costs each assigned to the communication link included in the path;

a first client signal path subset expanding step of expanding, by the computer system, the first client signal path subset into a second client signal path subset which is a subset of the client signal path set, by adding to the first client signal path subset an additional client signal path that has, as an end node thereof, the cost-optimum adjoining end node selected by the cost-optimum adjoining end node selecting step; and a first ring path expanding step of searching, by the computer system, the network topology information for a second ring path which is a ring path including all nodes of the first ring path and a pair of end nodes of the additional client signal path, on a predetermined condition.

14. The method of claim 13, wherein the cost-optimum adjoining end node selecting step comprises:

a cost-minimum path obtaining step of calculating, for each adjoining end node in the adjoining end node set, a path cost of a path from the adjoining end node to each node included in the first ring path, so as to obtain, for each adjoining end node, a cost-minimum path which has the lowest path cost among the one or more path costs obtained by calculating for each node in the first ring path; and a cost-minimum adjoining end node selecting step of selecting, from the adjoining end node set, a cost-minimum adjoining end node which is an adjoining end node included in the cost-minimum path having the lowest path cost among the one or more cost-minimum paths obtained by the cost-minimum path obtaining step.

15. The method of claim 13, wherein the cost-optimum adjoining end node selecting step comprises:

an expanded ring path obtaining step of searching for, for each adjoining end node in the adjoining end node set, an expanded ring path which is a ring path including the adjoining end node and all end nodes of the one or more client signal paths included in the first client signal path subset, on a predetermined condition, so as to obtain the expanded ring path;

an expanded ring path cost calculating step of calculating, for each adjoining end node in the adjoining end node set, an expanded ring path cost which is a path cost of the expanded ring path obtained by the expanded ring path obtaining step; and a cost-minimum adjoining end node selecting step of selecting, from the adjoining end node set, a cost-minimum adjoining end node which is an adjoining end node included in the expanded ring path having the lowest expanded ring path cost among the one or more expanded ring path cost obtained by the expanded ring path cost calculating step for each adjoining end node in the adjoining end node set.

16. The method of claim 13, further comprising:

a second client signal path subset providing step of providing, by the computer system, as a first client signal path subset, the second client signal path subset expanded by the first client signal path subset expanding step;

a second ring path providing step of providing, by the computer system, as a first ring path, the second ring path expanded by the first ring path expanding step;

a second client signal path subset expanding step of expanding, by the computer system, the first client signal path subset into a second client signal path subset by performing the first client signal path set expanding step on the first client signal path subset provided by the second client signal path subset providing step;

a second ring path expanding step of expanding, by the computer system, the first ring path into a second ring path by performing the first ring path expanding step on the first ring path provided by the second ring path providing step; and an expansion repeating step of repeating, by the computer system, the second client signal path subset providing step, the second ring path providing step, the second client signal path subset expanding step, and the second ring path expanding step, until the adjoining end node subset cannot be generated any more or until a path cost of the second ring path exceeds a predetermined path cost.

17. The method of claim 13, wherein the first client signal path subset expanding step expands the first client signal path subset into a second client signal path subset by adding, to the first path subset, one or more client signal paths which have end nodes both included in the first ring path and an additional client signal path that has, as an end node thereof, the cost-optimum adjoining end node selected by the cost-optimum adjoining end node selecting step.

* * * * *